US012017769B2

(12) United States Patent
Fredericks et al.

(10) Patent No.: US 12,017,769 B2
(45) Date of Patent: *Jun. 25, 2024

(54) UNMANNED AERIAL VEHICLE INCLUDING TRANSVERSELY EXTENDING SUPPORT BOOMS

(71) Applicant: Advanced Aircraft Company, Hampton, VA (US)

(72) Inventors: William J. Fredericks, Hampton, VA (US); Weston M. Lewis, Williamsburg, VA (US)

(73) Assignee: Advanced Aircraft Company, Hampton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,570

(22) Filed: Feb. 14, 2023

(65) Prior Publication Data

US 2023/0202654 A1 Jun. 29, 2023

Related U.S. Application Data

(63) Continuation of application No. 17/400,903, filed on Aug. 12, 2021, now Pat. No. 11,603,202, which is a (Continued)

(51) Int. Cl.
*B64C 39/02* (2023.01)
*B64C 7/00* (2006.01)
(Continued)

(52) U.S. Cl.
CPC .............. *B64C 39/024* (2013.01); *B64C 7/00* (2013.01); *B64C 29/0033* (2013.01);
(Continued)

(58) Field of Classification Search
CPC ..... B64C 7/00; B64C 29/0033; B64C 39/024; B64C 2201/027; B64C 2201/042;
(Continued)

(56) References Cited

U.S. PATENT DOCUMENTS

| 3,081,964 A | 3/1963 | Quenzier |
| 3,181,810 A | 5/1965 | Olson |

(Continued)

FOREIGN PATENT DOCUMENTS

| CN | 105460214 A | 4/2016 |
| EP | 2 937 123 A1 | 10/2015 |
| WO | WO2016/035068 A2 | 3/2016 |

OTHER PUBLICATIONS

Supplementary European Search Report dated Oct. 16, 2019, for European patent application No. 17786561.5.

*Primary Examiner* — Brady W Frazier
(74) *Attorney, Agent, or Firm* — Womble Bond Dickinson (US) LLP

(57) ABSTRACT

An unmanned aerial vehicle capable of VTOL operation can include: a vehicle body defining longitudinal and transverse directions and opposing longitudinal sides; a first support boom coupled to the vehicle body at a first transverse axis and extending outwardly from the opposing longitudinal sides; a second support boom coupled to the vehicle body at a second transverse axis positioned rearward from the first transverse axis and extending outwardly from the opposing longitudinal sides; a plurality of electric motors coupled to a one of the first and second support booms, at least two electric motors of the plurality of electric motors positioned on each of the first and second support booms, a rotation axis of each of the at least two electric motors coupled to the second support boom offset in a transverse direction from a rotation axis of each of the at least two adjacent electric motors coupled to the first support boom; a plurality of rotors; and a propulsion system.

27 Claims, 23 Drawing Sheets

Related U.S. Application Data continuation of application No. 16/094,568, filed as application No. PCT/US2017/028380 on Apr. 19, 2017, now Pat. No. 11,117,660.

(60) Provisional application No. 62/324,477, filed on Apr. 19, 2016.

(51) Int. Cl.
| | | |
|---|---|---|
| *B64C 29/00* | (2006.01) | |
| *B64D 27/02* | (2006.01) | |
| *B64D 27/04* | (2006.01) | |
| *B64D 27/24* | (2006.01) | |
| *B64U 10/13* | (2023.01) | |
| *B64U 30/20* | (2023.01) | |
| *B64U 50/19* | (2023.01) | |
| *F16F 15/08* | (2006.01) | |

(52) U.S. Cl.
CPC .......... *B64D 27/02* (2013.01); *B64D 27/04* (2013.01); *B64D 27/24* (2013.01); *B64D 27/026* (2024.01); *B64D 2221/00* (2013.01); *B64U 10/13* (2023.01); *B64U 30/20* (2023.01); *B64U 50/19* (2023.01); *F16F 15/08* (2013.01)

(58) Field of Classification Search
CPC  B64C 2201/108; B64D 27/02; B64D 27/026; B64D 27/24; B64D 2221/00
USPC ..................................................... 244/17.23
See application file for complete search history.

(56) References Cited

U.S. PATENT DOCUMENTS

| | | |
|---|---|---|
| 8,453,962 B2 | 6/2013 | Shaw |
| 9,598,169 B1 | 3/2017 | LeGrand, III |
| 9,623,967 B2 | 4/2017 | Mallard |
| 9,764,829 B1 | 9/2017 | Beckman |
| 10,099,784 B1 | 10/2018 | Nilson |
| 10,322,796 B2 | 6/2019 | Lee |
| 10,625,855 B2 | 4/2020 | Deng |
| 2003/0080242 A1 | 5/2003 | Kawai |
| 2011/0303795 A1 | 12/2011 | Oliver |
| 2012/0119016 A1 | 5/2012 | Shaw |
| 2016/0130015 A1 | 5/2016 | Caubel |
| 2016/0365810 A1 | 12/2016 | Armstrong |
| 2017/0036771 A1 | 2/2017 | Woodman |
| 2020/0324894 A1 | 10/2020 | Fredericks |
| 2021/0371102 A1 | 12/2021 | Fredericks et al. |

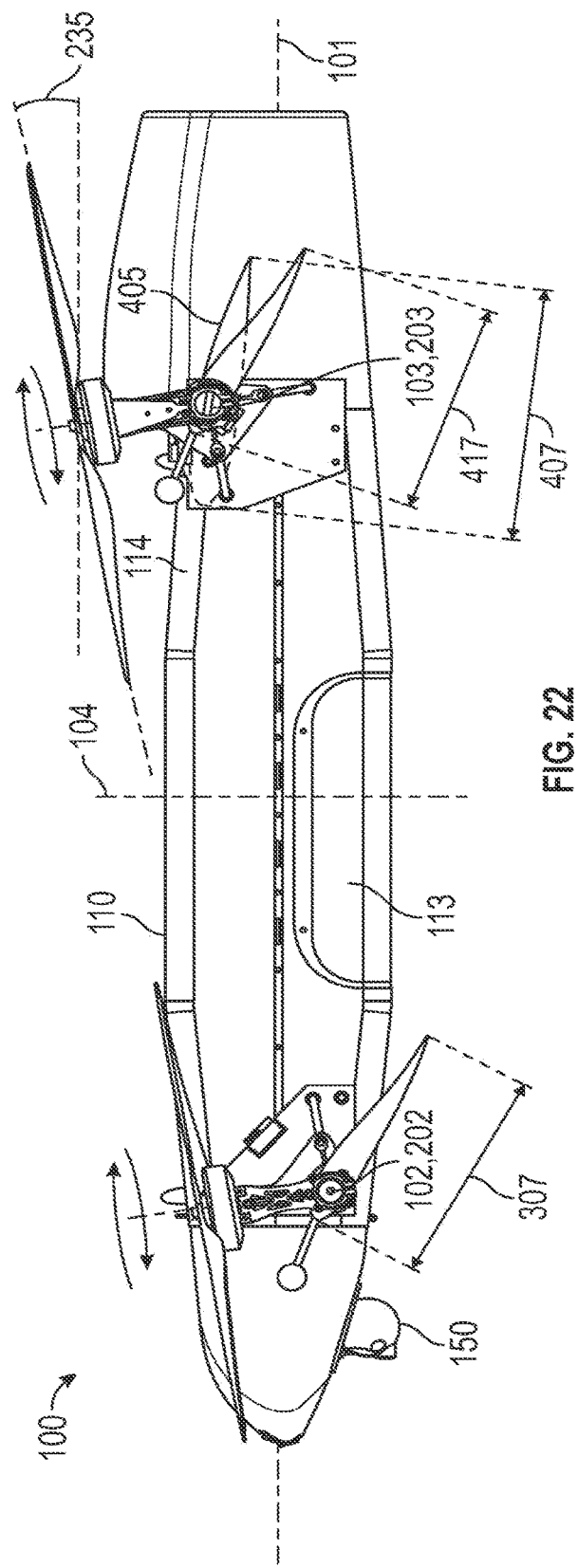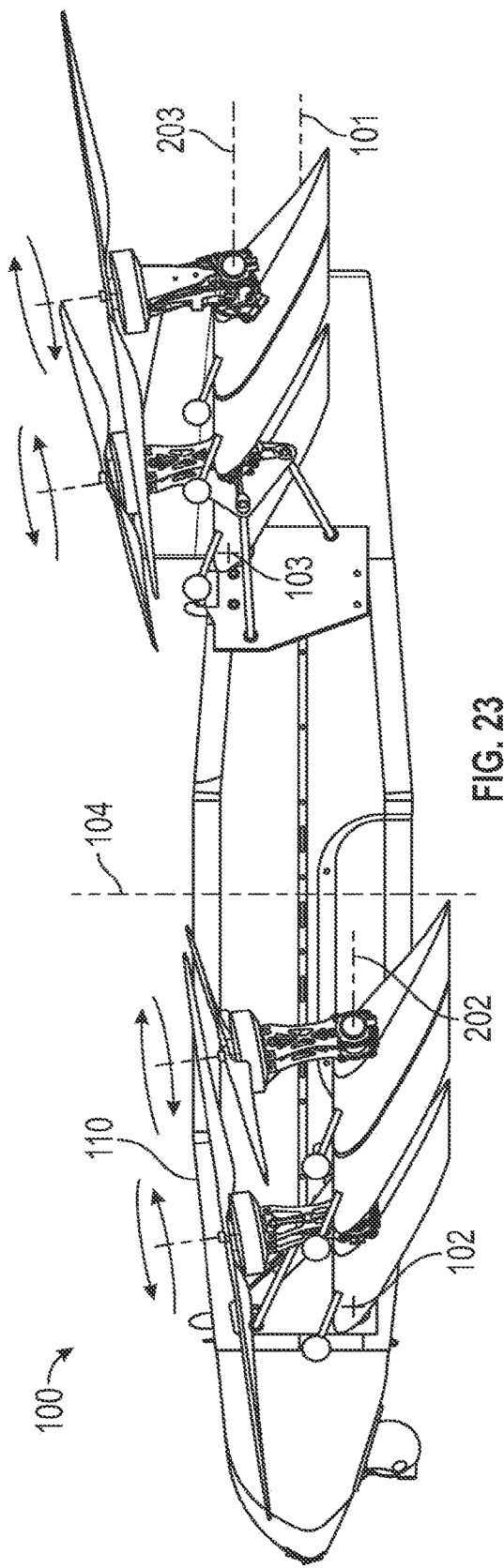

UNMANNED AERIAL VEHICLE INCLUDING TRANSVERSELY EXTENDING SUPPORT BOOMS

CROSS-REFERENCE TO RELATED APPLICATION

The present Patent Application is a Continuation of U.S. application Ser. No. 17/400,903, filed Aug. 12, 2021, which is a Continuation of U.S. application Ser. No. 16/094,568, filed Oct. 18, 2018, now U.S. Pat. No. 11,117,660, issued Sep. 14, 2021, which is a National Phase of PCT/US2017/028380, filed Apr. 19, 2017, which claims benefit of U.S. Provisional Application No. 62/324,477, filed Apr. 19, 2016.

INCORPORATION BY REFERENCE

The disclosures of U.S. application Ser. No. 17/400,903, filed Aug. 12, 2021, U.S. application Ser. No. 16/094,568, filed Oct. 18, 2018, U.S. application Ser. No. PCT/US2017/028380, filed Apr. 19, 2017, and U.S. Provisional Application No. 62/324,477, filed Apr. 19, 2016, are hereby incorporated by reference for all purposes as if presented herein in their entireties.

BACKGROUND

An unmanned aerial system ("UAS") or unmanned aerial vehicle ("UAV") can be a useful and cost-effective tool for numerous commercial applications, but its usefulness is limited by the range and efficiency of currently available products.

SUMMARY

Described herein is an unmanned aerial vehicle. In one aspect, the aerial vehicle can comprise a vehicle body defining an internal cavity; at least one support boom coupled to the vehicle body; at least one fairing rotatably coupled to each at least one support boom; and a propulsion system operably coupled to each at least one support boom. In another aspect, it is contemplated that the propulsion system for the unmanned aerial vehicle can be a hybrid propulsion system. In this exemplary aspect, the hybrid propulsion system can comprise a combustion engine positioned within the internal cavity of the body; an electrical bus operatively coupled to the combustion engine; a plurality of electric motors, each of the plurality of electric motors electrically coupled to the electrical bus; and a plurality of rotors, each of the plurality of rotors being operably coupled to a respective one of the plurality of electric motors.

Also disclosed is an unmanned aerial vehicle that can perform a vertical takeoff and landing, the vehicle comprising: a vehicle body defining a longitudinal direction and a transverse direction, the vehicle body having opposing longitudinal sides; a first support boom coupled to the vehicle body at a first transverse axis and extending outwardly from the opposing longitudinal sides of the vehicle body; a second support boom coupled to the vehicle body at a second transverse axis positioned rearward from the first transverse axis and extending outwardly from the opposing longitudinal sides of the vehicle body; a plurality of electric motors, each of the plurality of electric motors coupled to a one of the first support boom and the second support boom, at least two electric motors of the plurality of electric motors positioned on each of the first support boom and the second support boom, a rotation axis of each of the at least two electric motors coupled to the second support boom offset in a transverse direction from a rotation axis of each of the at least two adjacent electric motors coupled to the first support boom; a plurality of rotors, each of the plurality of rotors coupled to a respective one of the plurality of electric motors; and a propulsion system coupled to the vehicle body.

Also disclosed is an unmanned aerial vehicle that can perform a vertical takeoff and landing, the vehicle comprising: a vehicle body defining a longitudinal direction and a transverse direction, the vehicle body having opposed longitudinal sides; a first support boom coupled to the vehicle body at a first transverse axis and extending outwardly from the opposing longitudinal sides of the vehicle body at least partially in the transverse direction; a second support boom coupled to the vehicle body at a second transverse axis positioned rearward from the first transverse axis and extending outwardly from the opposing longitudinal sides of the vehicle body at least partially in the transverse direction; a plurality of electric motors, each of the plurality of electric motors coupled to a one of the first support boom and the second support boom, at least two electric motors of the plurality of electric motors positioned on each of the first support boom and the second support boom, a rotation axis of each of the at least two electric motors coupled to the second support boom offset in a transverse direction from a rotation axis of each of the at least two electric motors coupled to the first support boom; a plurality of rotors, each of the plurality of rotors coupled to a respective one of the plurality of electric motors; and a hybrid propulsion system coupled to the vehicle body, the hybrid propulsion system comprising: a combustion engine positioned within the internal cavity of the body; an electric generator positioned within the internal cavity of the body; an electrical bus operatively coupled to the electric generator; a plurality of electric motors, each of the plurality of electric motors electrically coupled to the electrical bus.

Also disclosed is an aerial vehicle comprising: a vehicle body; at least one support boom coupled to the vehicle body; and a hybrid propulsion system coupled to the vehicle body.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain the general principles of the invention. The drawings are not necessarily drawn to scale. Corresponding features and components throughout the figures may be designated by matching reference characters for the sake of consistency and clarity.

FIG. 22 is a left side view of the UAV of FIG. 9, which is a mirror image of the right side of the UAV of FIG. 9;

FIG. 23 is a left side view of the UAV of FIG. 8, which is a mirror image of the right side of the UAV of FIG. 8;

DETAILED DESCRIPTION

Figure 1:
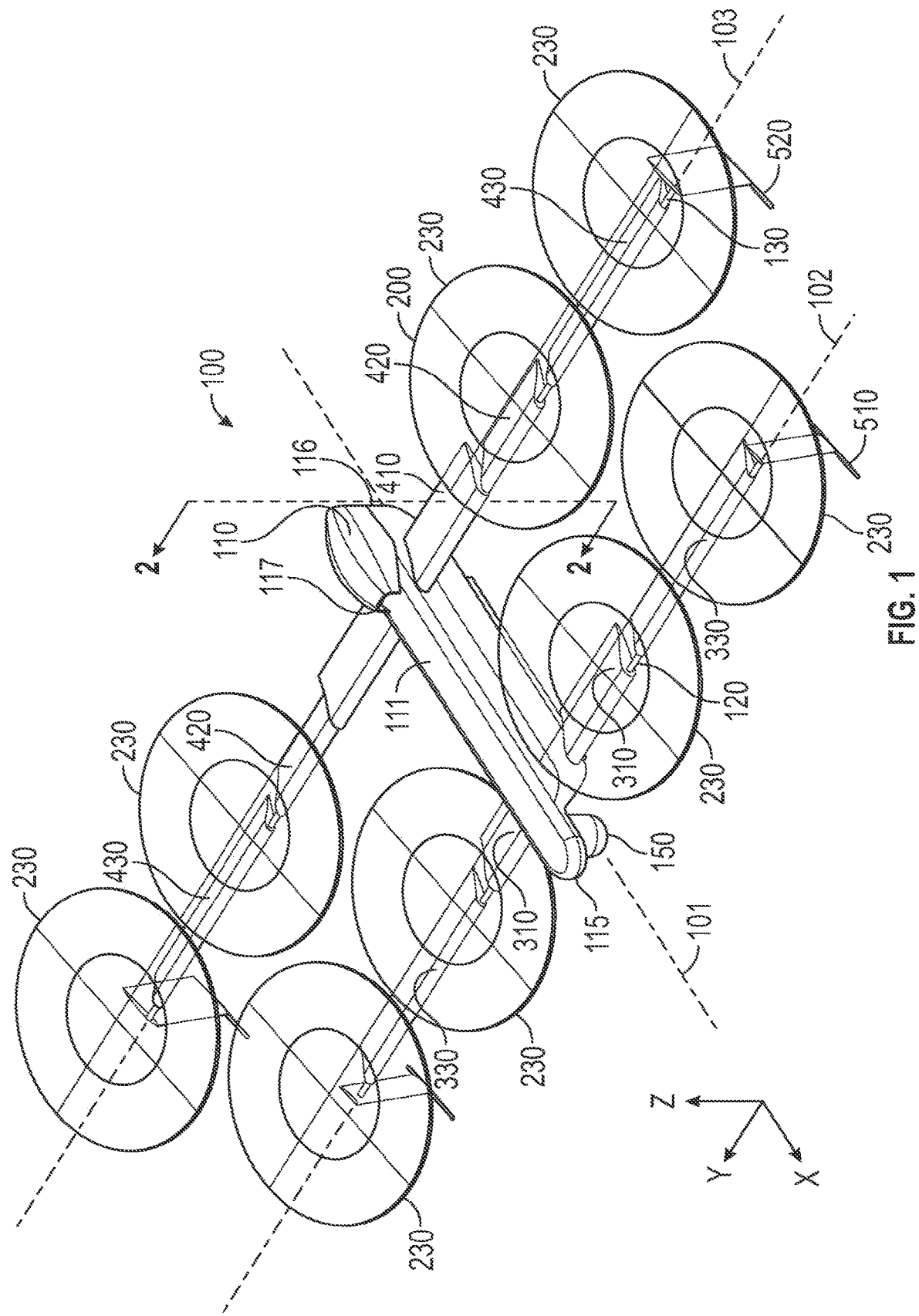
FIG. 1 is a top front perspective view of an unmanned aerial vehicle (UAV) in accordance with one aspect of the current disclosure.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the one aspect of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a rotor" can include two or more such rotors unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. Further, one should note that conditional language, such as, among others, "can," "could,"

"might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

To simplify the description of various elements of an unmanned aerial system or unmanned aerial vehicle disclosed herein, which terms UAS and UAV may be used interchangeably, the conventions of "front," "rear," "left," "right," "top," "bottom," "upper," "lower," "inside," "outside," "inboard," "outboard," "forward," or "aft" may be referenced. Unless stated otherwise here or in the figures, "front" describes that portion of the UAV that is ordinarily leading in flight and extending or facing at least partially in an X-axis direction (shown in FIG. 1); "rear" is that portion of the UAV that is opposite or distal the front of the UAV and is configured to trail the front of the UAV when the UAV is moving in a forward direction; "right" is that which is to the right of, extending, or facing at least partially right from a position on a longitudinal axis of the UAV and facing towards the front of the UAV, i.e., in a Y-axis direction (shown in FIG. 1); "left" is that which is to the left of, extending, or facing at least partially left from a position on a longitudinal axis of the UAV and facing towards the front of the UAV; and "top" or "upper" is that which is extending from the longitudinal axis of the UAV and in a Z-axis direction that can be parallel to a vertical central axis of the UAV.

In one aspect, an unmanned aerial system and associated methods, systems, devices, and various apparatuses are disclosed herein. In one aspect, the system can comprise a hybrid propulsion system comprising a combustion engine and at least one electric motor. In another aspect, the system can comprise an aerodynamic fairing. In yet another aspect, the system can comprise a plurality of rotors on a first boom that are staggered with respect to a plurality of rotors on a second boom. In one aspect, the UAV 100 is a vertical takeoff and landing (VTOL) unmanned aerial system (UAS).

Referring to FIGS. 1-30, described herein is an unmanned aerial vehicle and associated methods, systems, and various apparatus. In one aspect, the aerial vehicle can comprise a vehicle body defining an internal cavity; at least one support boom coupled to the vehicle body; at least one fairing rotatably coupled to each at least one support boom; and a propulsion system operably coupled to each at least one support boom. In another aspect, it is contemplated that the propulsion system for the unmanned aerial vehicle can be a hybrid propulsion system.

FIG. 1 shows an unmanned aerial vehicle 100. In one aspect, the UAV 100 is an unmanned aerial system or is one portion of an unmanned aerial system. The UAV 100 can comprise a vehicle body 110—which can also be described as a fuselage—comprising a first end 115 and a second end 116 and an outer surface 111 defining various openings and surfaces for the attachment of other components. In one aspect, the first end 115 and the second end 116 can be oriented along a longitudinal axis 101, which itself can be parallel to a fuselage waterline of the vehicle body 110. The first end 115 can also be described as a front end or a nose of the vehicle body 110, and the second end 116 can also be described as a back end, a rear end, or a tail of the vehicle body 110. In one aspect, the first end 115 comprises a camera turret 150 for selectively capturing video or still images. In another aspect, the UAV 100 at the first end 115, in place of the camera turret 150, can comprise any monitoring device or instrument such as, for example and without limitation, a gas leak sensor, an air pressure sensor, a spray head, or a combination of one or more such devices. In another aspect, the UAV 100 can define an air inlet 117 and an air outlet 118 (shown in FIG. 6).

The UAV 100 can further comprise at least one support boom. In one aspect, the UAV 100 can comprise a first support boom 120, which can be coupled to the vehicle body 110 and oriented along a first transverse axis 102. In another aspect, the UAV 100 can further comprise a second support boom 130, which can also be coupled to the vehicle body 110 and oriented along a second transverse axis 103. Each of the first transverse axis 102 and the second transverse axis 103 are perpendicular to the longitudinal axis 101. In another aspect, as will be described below, the first support boom 120, the second support boom 130, or both the first support boom 120 and the second support boom 130 can be angled with respect to a one of the first transverse axis 102 and the second transverse axis 103, respectively. Moreover, each of the first support boom 120 and the second support boom 130 or any portion thereof can be either hollow or solid or can have portions which are hollow and portions which are solid. A hollow inner cavity of the support boom 120,130 can be used to electrically couple each of the propulsion devices—such as an electric motor—with its source of power using electrical wiring. In one aspect, the support booms 120,130 are circular in cross-section. In another optional aspect, the support booms 120,130 can be non-circular in cross-section and can be configured to allow a fairing received thereon to rotate freely thereabout. The support booms 120,130 can be constant in cross-section or may vary in size or shape over their length.

In one aspect, the UAV 100 further comprises at least one fairing rotatably coupled to a one of the first support boom 120 and the second support boom 130. It is contemplated that the at least one fairing is configured to be drag reducing in operation. It is further contemplated that the at least one fairing can act, in addition to having drag-reducing properties, as a "free wing." As shown, the UAV 100 can exemplarily comprise a pair of first inner fairings 310 and a pair of first outer fairings 330 rotatably coupled to the first support boom 120. As shown, the UAV 100 further can further exemplarily comprise a pair of second inner fairings 410, a pair of second intermediate fairings 420, and a pair of second outer fairings 430 rotatably coupled to the second support boom 130. In one optional aspect, each of the first support boom 120 and the second support boom 130 can have a first side and a second side corresponding respectively to a left side and a right side. In another aspect, the first support boom 120 or the second support boom 130 can comprise multiple pieces.

The UAV 100 can further comprise one or more landing gear. As exemplarily shown in FIG. 1, without limitation, the UAV 100 comprises a pair of front landing gear 510 coupled to the first support boom 120 and a pair of rear landing gear 520 coupled to the second support boom 130.

The UAV 100 can further comprise a propulsion system 200, which can be a hybrid propulsion system. In this aspect, the propulsion system 200 can comprise a combustion engine 210 (shown in FIG. 25) and various electric motors and rotors for propelling the UAV 100. In one aspect, the combustion engine 210 can be a conventional internal combustion engine. In one exemplary aspect, for example and without limitation, the combustion engine 210 can comprise a two-stroke gasoline-powered reciprocating internal combustion engine comprising at least one piston such as the type used in a radio-controlled (RC) model airplane. In another aspect, the combustion engine 210 can comprise an electrical generator 260 for powering various electrical components of the UAV and storing energy in an energy storage subsystem 270. For example, and without limitation, such a combustion engine 210 comprising the electrical generator 260 can comprise a 1.5 kW generator set available from Launchpoint Technologies of Goleta, CA, U.S.A. In another optional aspect, the combustion engine 210 can be powered by a fuel other than gasoline or is other than a two-stroke engine. For example, and without limitation, the combustion engine 210 can be a four-stroke engine, can be fueled by diesel or heavy fuel, can be of another type of engine construction such as a Wankel engine, or can be powered by fuel cells.

Figure 2:
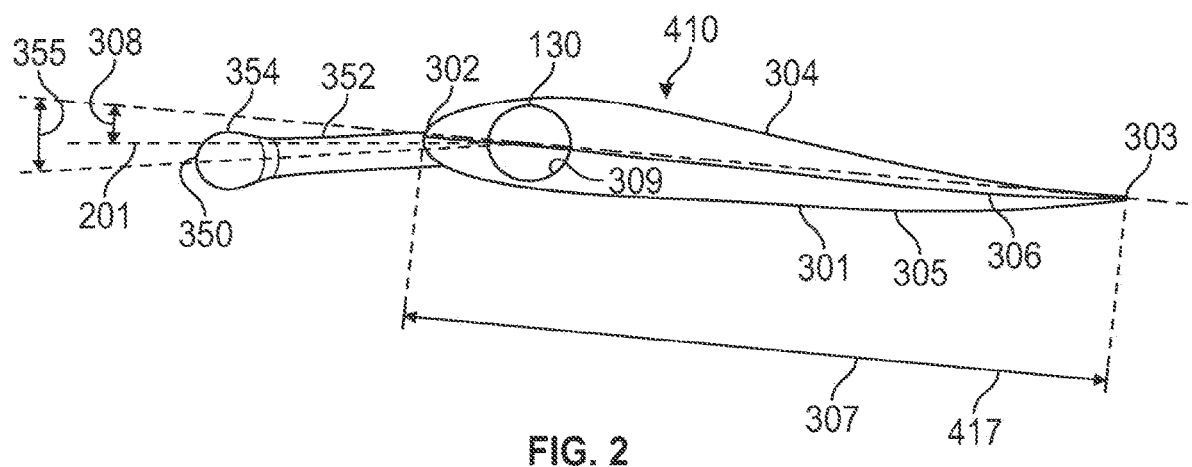
FIG. 2 is a sectional view of a fairing of the UAV of FIG. 1 taken along line 2-2 of FIG. 1.

The UAV 100 can further comprise a plurality of electric motors 220 and a plurality of rotors 230. In this aspect, and as illustrated, it is contemplated that each of the plurality of rotors 230 can be operably coupled to a respective one of the plurality of electric motors 220 and each of the plurality of electric motors 220 can be operably and fixedly coupled to a one of the first support boom 120 and the second support boom 130. In one aspect, each of the electric motors 220 can be a brushless direct-current (DC) motor. In another aspect, each of the electric motors 220 can be an alternating-current (AC) motor. For example, and without limitation, each of the electric motors 220 can comprise a 135 kV U8 Pro model motor obtainable from T-Motor of China. In one aspect, each of the electric motors 220 can be controlled by a three-phase electronic speed controller (ESC) 225 (shown in FIG. 29) producing a DC output. In another aspect, each of the electric motors 220 can be controlled by a three-phase ESC 225 producing an AC output. For example, and without limitation, the ESC 225 can comprise a Phoenix Edge Lite 50 model ESC obtainable from Castle Creations of Olathe, Kansas, U.S.A. Referring to FIG. 2, each of the plurality of rotors 230 is exemplarily shown as two concentric circles offset from and above a one of the first support boom 120 and the second support boom 130. Each electric motor 220 can define a rotation axis about which the electric motor produces rotational motion able to drive the rotor 230.

In one aspect, each of the plurality of rotors 230 can be a conventional fixed-pitch rotor that has at least two blades, a desired operative diameter, and a desired pitch. Optionally, each of the plurality of rotors 230 can be a conventional non-fixed-pitch rotor that has at least two blades, a desired operative diameter, and a desired pitch range. One skilled in the art will appreciate that the selection of the particular rotors will insure maximum performance without operable interference with adjacent rotors. Each of the blades can comprise lead-lag hinges to, for example and without limitation, accommodate more compact storage. For example, and without limitation, each of the rotors 230 can be one formed from carbon fiber and is obtainable from T-Motor.

In one exemplary aspect, for example and without limitation, each of the fixed-pitch rotors 230 can have two blades having an overall operable diameter of 29 inches and a pitch of 9.5 inches. In another aspect, each of the rotors 230 can have at least two blades. In another aspect, each of the rotors 230 can have blades having an overall operable diameter of greater than or less than 29 inches. In another aspect, each of the rotors 230 can have blades having a pitch that is greater than or less than 9.5 inches or blades having a pitch in a range between about 7.5 and about 11.5 inches. In yet another aspect, the blades can have an overall operable diameter of 28.2 inches and a pitch of 9.2 inches. In one aspect, the blades can be non-folding. In another aspect, the blades can be folding.

In one exemplary aspect, the quantity of electric motors 220 on the UAV can be between 3 and 12 motors, preferably between 4 and 10 motors, and most preferred between 4 and 8 motors. In this aspect, it is contemplated that one rotor is operably coupled to one respective electric motor 220. Further, in a further aspect, it is contemplated that the respective diameter of each rotor 230 can be substantially equal or, optionally, the rotors 230 can differ in operative diameter. In another aspect, the UAV can comprise more than ten electric motors 220.

In one aspect, intake air supplied to the combustion engine 210 can be supplied through the air inlet 117 and exhaust air can be released through the air outlet 118. It is contemplated that, in addition to conventionally being delivered to the combustion chamber of the internal combustion engine, the air entering the internal cavity of the vehicle body 110 via the air inlet 117 and exiting the internal cavity of the vehicle body 110 via the air outlet 118 can provide cooling to the combustion engine 210, the electrical bus 250, and various other components of the propulsion system 200 that can be positioned within the internal cavity of the vehicle body 110.

As shown in FIG. 2 for the representative second inner fairing 410, each of the first inner fairing 310, the first outer fairing 330, the second inner fairing 410, the second intermediate fairing 420, and the second outer fairing 430 can be formed, or otherwise shaped, to have an airfoil shape 301 in cross-section and can comprise a leading edge 302, a trailing edge 303, an upper camber 304, a lower camber 305, a mean line 306. In one aspect, the airfoil shape 301 can be, for example and without limitation, a reflexed cambered airfoil shape. The airfoil shape 301 defines a chord length 307, which can be lengthened or shortened and the rest of the geometry scaled accordingly between each of the fairings. In one aspect, the airfoil shape 301 of each of the first inner fairing 310, the first outer fairing 330, the second inner fairing 410, the second intermediate fairing 420, and the second outer fairing 430 can have a different chord length 307. In another aspect, the airfoil shape 301 of at least two of the first inner fairing 310, the first outer fairing 330, the second inner fairing 410, the second intermediate fairing 420, and the second outer fairing 430 can have a chord length 307 measuring the same value. The airfoil shape 301 of each of the first inner fairing 310, the first outer fairing 330, the fixed fairing 405, the second inner fairing 410, the second intermediate fairing 420, and the second outer fairing 430 can be said to have respective chord lengths 317, 337, 407 (shown in FIG. 22), 417, 427, 437 (shown in FIG. 4). As one skilled in the art will appreciate, it is contemplated that each of the first inner fairing 310, the first outer fairing 330, the second inner fairing 410, the second intermediate fairing 420, the second outer fairing 430, and any other fairing disclosed herein can be either hollow or solid or can have portions which are hollow and portions which are solid. The use of hollow fairings can, for example and without limitation, reduce the weight of the fairings. In one optional aspect, the airfoil shape 301 can change in size or shape over the length of the fairing.

In one aspect, each of the first inner fairings 310, the first outer fairings 330, the second inner fairings 410, the second intermediate fairings 420, and the second outer fairings 430 can define a mounting bore 309 through which a one of the support boom 120 and the support boom 130 is received and about which each fairing rotates. In one aspect, as shown in FIG. 2, each of the first inner fairings 310, the first outer fairings 330, the second inner fairings 410, the second intermediate fairings 420, and the second outer fairings 430 can further comprise a counterweight 350 comprising a counterweight rod 352 and a counterweight tip 354.

In one aspect, it is contemplated that the airfoil shape 301, either with or without the counterweight 350, can be passively stable in flight at any angle of attack 308 relative to a horizontal axis 201. In one aspect, the airfoil shape 301, either with or without the counterweight 350, can trim to an angle of attack 308 in a range of between about 12 to about −12 degrees. In another aspect, the airfoil shape 301, either with or without the counterweight 350, can trim to an angle of attack 308 in a range of between about zero to about eight degrees. In another aspect, the airfoil shape 301, either with or without the counterweight 350, can trim to an angle of attack 308 in a range of between about two to about six degrees. In still another aspect, the airfoil shape 301, either with or without the counterweight 350, can trim to an angle of attack 308 in a range from between about three to about five degrees. In yet another aspect, the airfoil shape 301, either with or without the counterweight 350, can trim to an angle of attack 308 in a range of about four degrees.

In one aspect, it is contemplated that the counterweight 350 allows the center of gravity of the fairing to mass balance about an axis of rotation of the fairing. In one aspect, the axis of rotation can be coaxial with the mounting bore 309. In other aspects, with or without the counterweight 350, is contemplated to configure the counterweight 350 such that the center of gravity of the fairing is positioned in front of, behind, above, or below the axis or rotation of the fairing.

Figure 3:
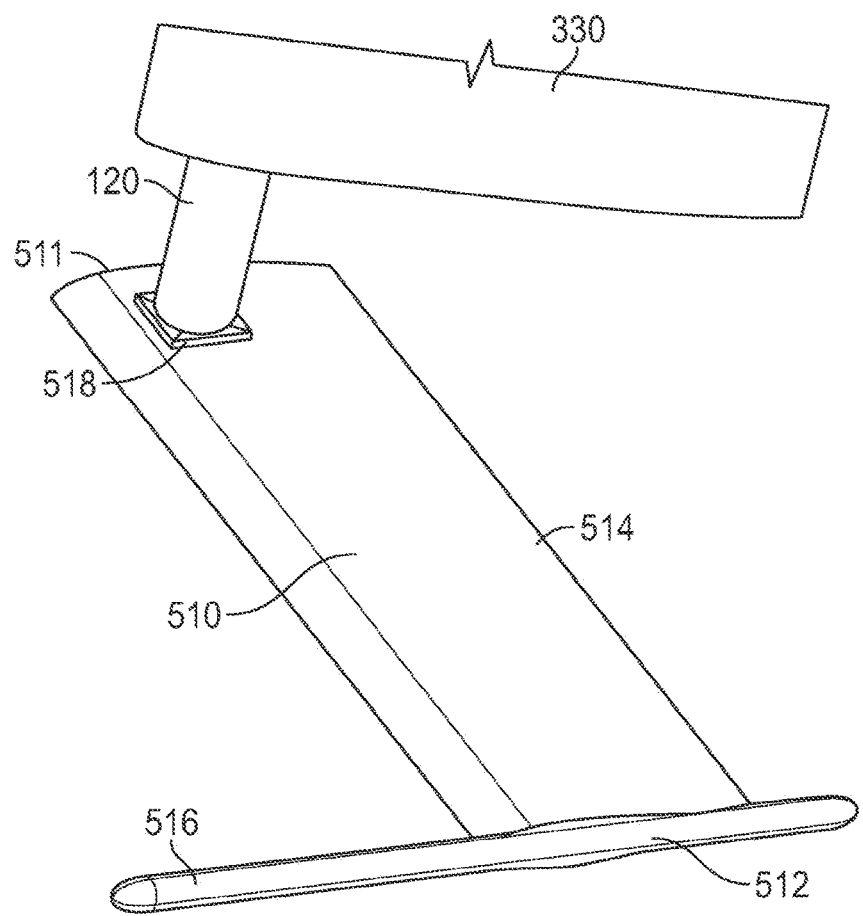
FIG. 3 is a bottom perspective view of a front landing gear of the UAV of FIG. 1.

FIG. 3 shows a bottom inside perspective view of one of the front landing gear 510. In one aspect, each of the front landing gear 510 and the rear landing gear 520 can have an airfoil shape in cross-section for reducing the drag resulting from the presence of the front landing gear 510 and the rear landing gear 520. In one aspect, the landing gear 510,520 can additionally provide improved directional stability for the UAV 100 and result in less yaw control being required. In another aspect, the front landing gear 510 and the rear landing gear 520 or any portion thereof can have any shape in cross-section such as, for example and without limitation, circular, square, rectangular, or any rounded polygon. Moreover, each of the front landing gear 510 and the rear landing gear 520 or any portion thereof can be either hollow or solid or can have portions that are hollow and portions that are solid.

More specifically, the front landing gear 510 can comprise a vertical portion 514, a skid or horizontal portion 516 proximate to a lower end 512, and a mounting portion 518 proximate to an upper end 511. More specifically, the vertical portion 514 can have an airfoil shape in cross-section, a leading edge of the airfoil shape facing towards the front of the UAV 100 and a trailing edge of the airfoil shape facing towards the rear of the UAV 100. The horizontal portion 516 can have a circular shape in cross-section, an upper portion of the horizontal portion 516 coupled to the vertical portion 514 and a lower portion of the horizontal portion 516 configured to rest on any landing surface, which will typically be a horizontal landing surface. The horizontal portion 516 can extend beyond the vertical portion 514 at the front or at the rear in order to adjust the stability of the UAV 100 upon landing, especially landing that commences with less than simultaneous engagement of all landing gear with the landing surface. In another aspect, landing gear (not shown) are mounted to the bottom of the vehicle body 110.

In another aspect, the UAV 100 requires no separate landing gear and a portion of the vehicle body 110 or another portion of the UAV 100 is either configured to rest directly on the landing surface or else is captured while in flight by other means. As shown, the chord length of the airfoil shape of the vertical portion 524 of the rear landing gear 520 is twice the chord length of the airfoil shape of the vertical portion 514 of the front landing gear 510.

Figure 4:
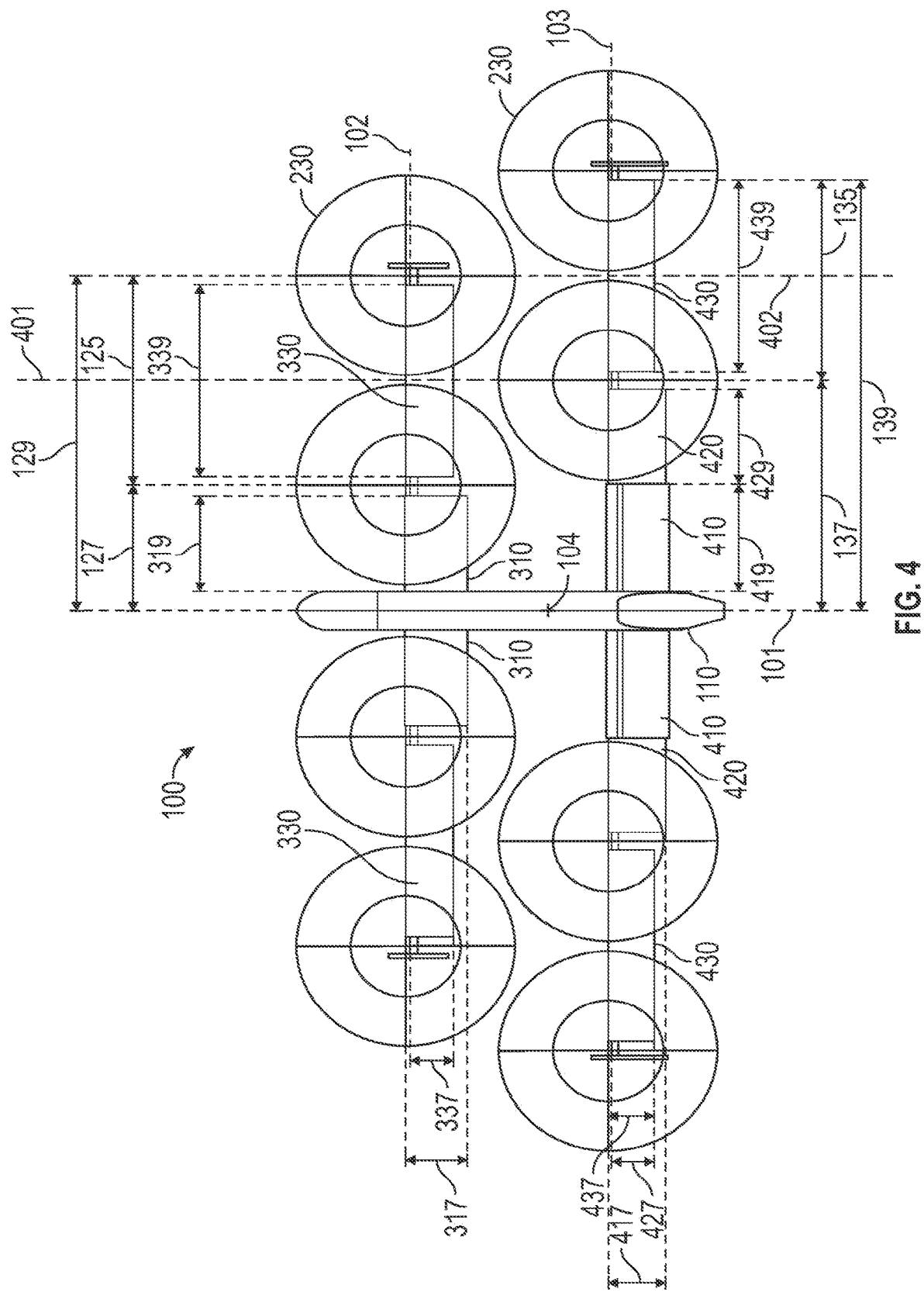
FIG. 4 is a top view of the UAV of FIG. 1.

FIG. 4 shows a top view of the UAV 100 in which each of the fairings, the chord length of each aligned with the longitudinal axis 101, defines a fairing length. In one aspect, each of the first inner fairing 310, the first outer fairing 330, the second inner fairing 410, the second intermediate fairing 420, and the second outer fairing 430 can be said to have respective fairing lengths 319, 339, 419, 429, 439 as measured parallel to a one of the transverse axis 102 and the transverse axis 103. Moreover, the fairings on the left side of the UAV 100 can be said to have the same geometry as the fairings on the right side of the UAV 100. As exemplarily shown, it is optionally contemplated to position the respective rotors non-equidistant from the center of gravity.

As shown, each central axis of the rotors 230 that are coupled to the first support boom 120 can be staggered with respect to each central axis of the rotors 230 coupled to the second support boom 130. In one aspect, a central axis of an inboard rotor 230 that is coupled to the first support boom 120 can be spaced apart from a central axis of an outboard rotor 230 that is coupled to the first support boom 120 by a rotor spacing 125 and can be spaced apart from the longitudinal axis 101 by an offset distance 127. In such aspect, the outboard rotor 230 that is coupled to the first support boom 120 can be spaced apart from the longitudinal axis 101 by an offset distance 129. Likewise, a central axis of an inboard rotor 230 that is coupled to the second support boom 130 can be spaced apart from a central axis of an outboard rotor 230 that is coupled to the second support boom 130 by a rotor spacing 135 and can be spaced apart from the longitudinal axis 101 by an offset distance 137. In such aspect, the outboard rotor 230 that is coupled to the second support boom 130 can be spaced apart from the longitudinal axis 101 by an offset distance 139. In one aspect, the rotor spacing 135 can be equal to the rotor spacing 125, and the offset distance 137 can be equal to the offset distance 127 plus half the rotor spacing 125. As shown, a gap can be defined by and between the tips of each rotor 230 from the rotors 230 on the same support boom and with the rotors 230 on a different support boom. It is contemplated that staggering the rotors 230 as shown helps to maximize the air available in edgewise flight to each rotor, including during forward motion of the UAV 100 along the direction of the longitudinal axis 101 and thus minimize the interference between the respective rotors 230.

Figure 5:
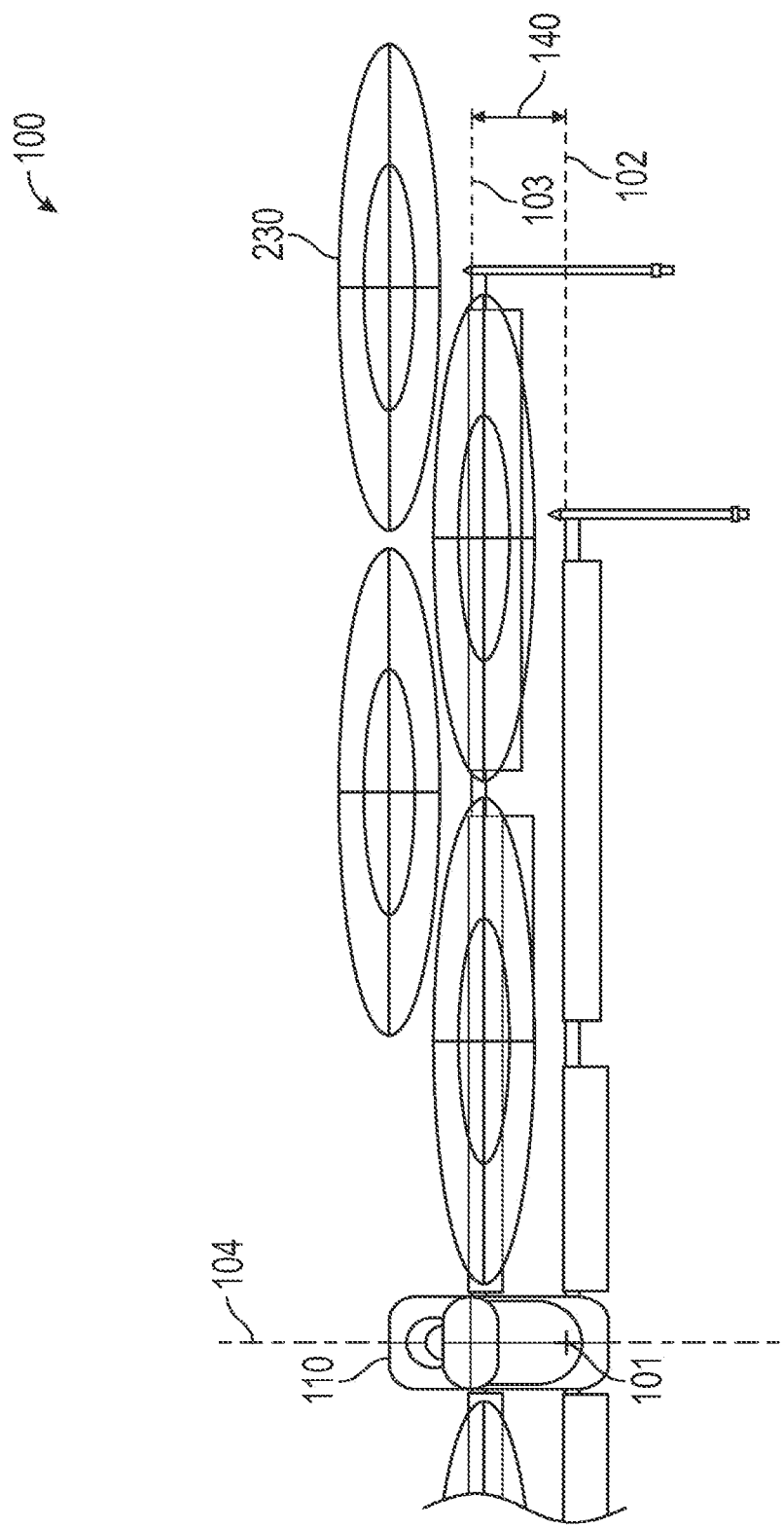
FIG. 5 is a partial front view of a left side of the UAV of FIG. 1, which is a mirror image of a right side of the UAV.

FIG. 5 shows a front view of the UAV 100 in flight. In one aspect, when the UAV 100 is in flight, the longitudinal axis 101 of the UAV 100 is aligned along a horizontal axis and a central axis 104 that is perpendicular to both the longitudinal axis 101 and each of the transverse axes 102, 103 is aligned along a vertical axis. In such aspect, the drag created by the fuselage during forward flight is minimized and yet each of the plurality of rotors 230 can be angled forward in order to create such forward motion. As shown, when the longitudinal axis 101 of the UAV 100 is aligned along a horizontal axis, the first support boom 120 can be offset vertically from a second support boom 130 by an offset distance 140. When in hover mode, i.e., when the UAV 100 is in flight but not in motion relative to the ground, the longitudinal axis 101 of the UAV 100 can be angled with respect to a horizontal axis.

Figure 6:
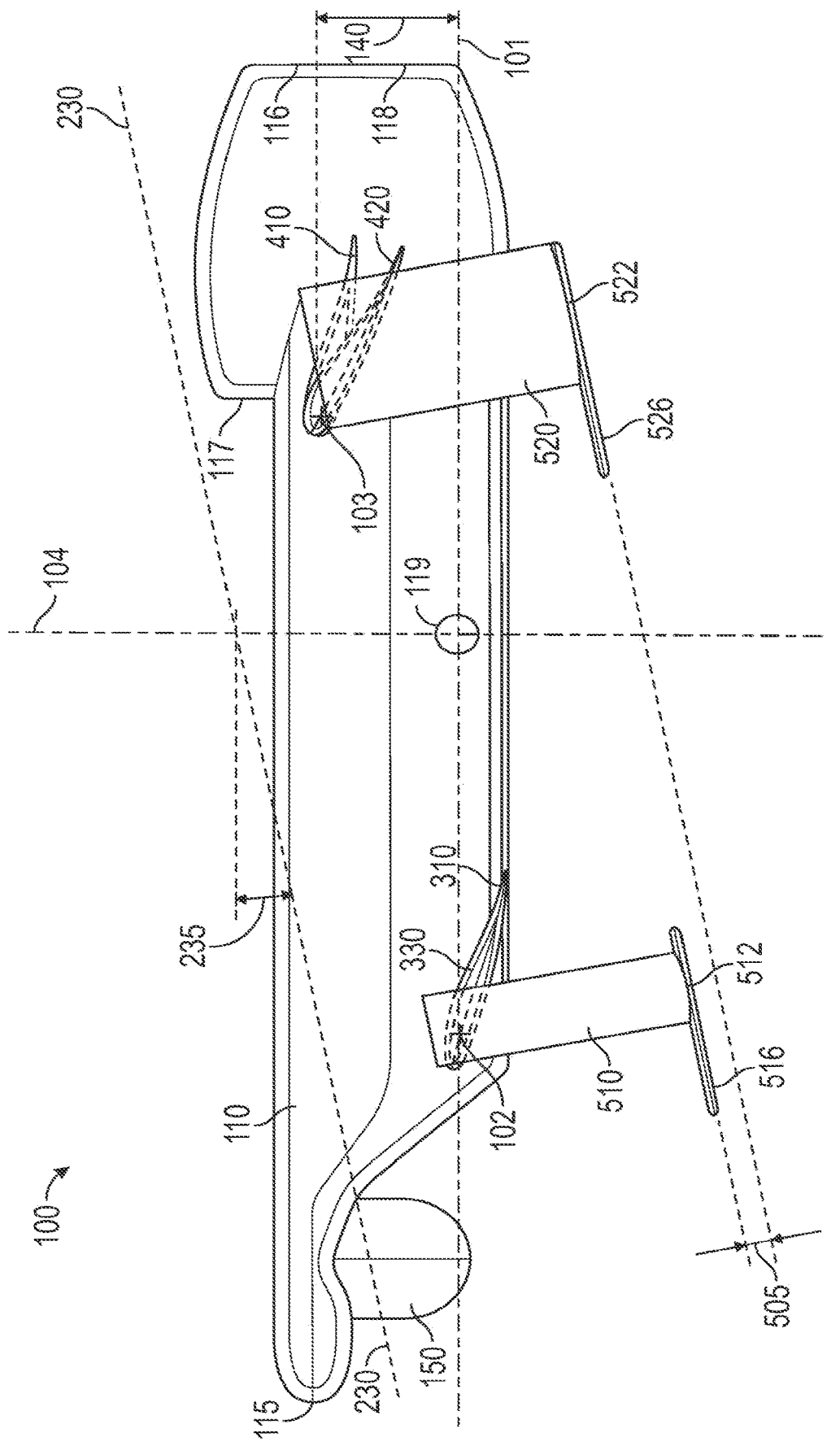
FIG. 6 is a left side view of the UAV of FIG. 1.
Figure 7:
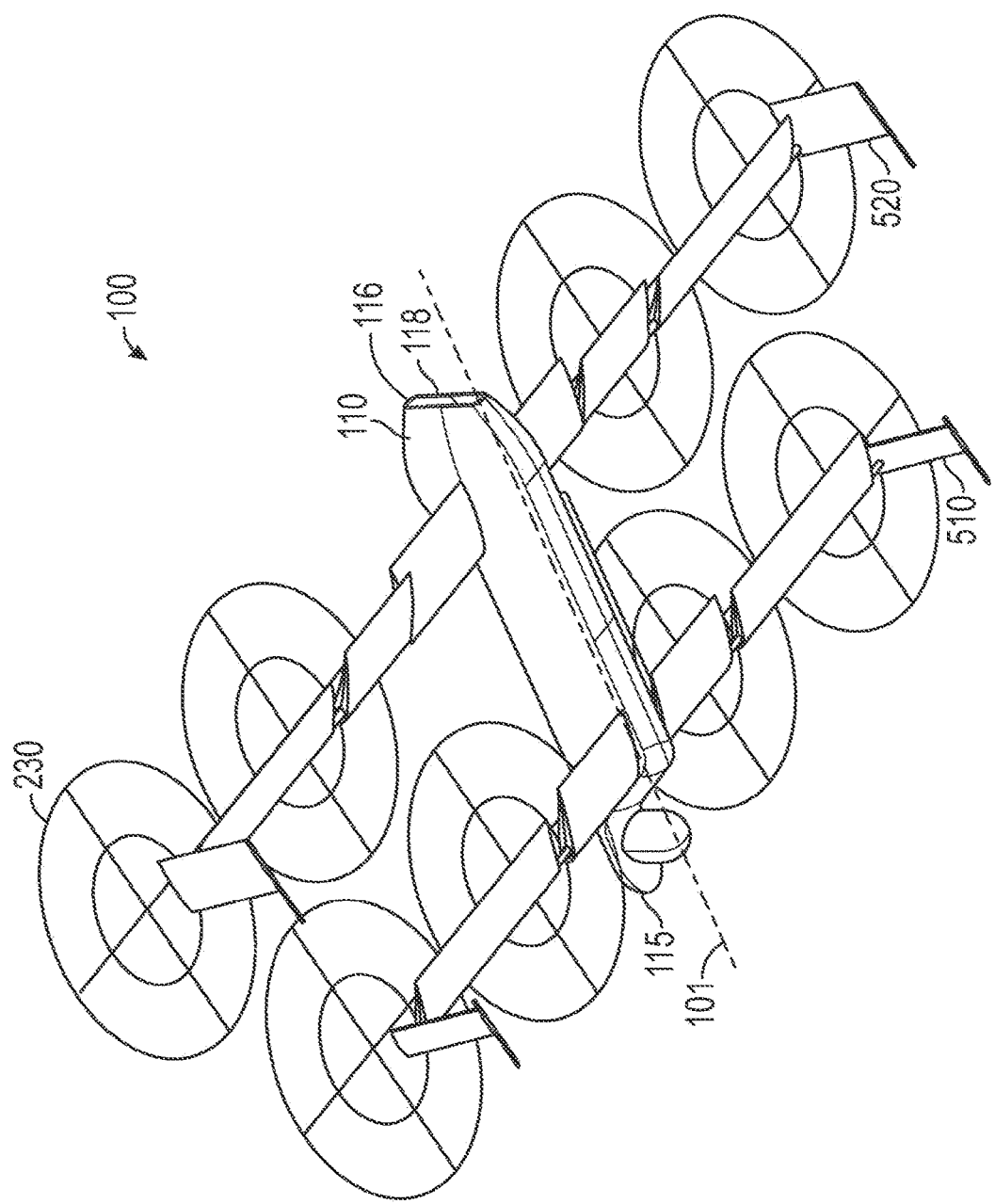
FIG. 7 is a bottom rear perspective view of the UAV of FIG. 1.

FIG. 6 shows a left side view of the UAV 100 in flight. In one aspect, each of the plurality of rotors 230 (shown in FIG. 1) is angled at a desired tilt angle 235 when the longitudinal axis 101 of the vehicle body 110 is aligned along a horizontal axis as shown in order to create forward motion of the UAV 100. In another aspect, and without limitation, each of the plurality of rotors 230 can be angled at a tilt angle 235 that ranges between about 9 to about 13 degrees when the longitudinal axis 101 of the vehicle body 110 is aligned along a horizontal axis. In yet another aspect, and without limitation, each of the plurality of rotors 230 is angled at a tilt angle 235 that ranges between about 10 to about 12 degrees when the longitudinal axis 101 of the vehicle body 110 is aligned along a horizontal axis. In one aspect, the tilt angle 235 is set such that at cruise condition during forward flight the longitudinal axis 101 of the UAV 100 is aligned along a horizontal axis.

The vehicle body 110 defines an internal cavity 112 in which the combustion engine 210 and an electrical bus 250 (shown in FIG. 28) operatively coupled to an output of the combustion engine 210 are both positioned. In one aspect, the combustion engine 210 and the electrical bus 250 and each of the other components of the UAV 100 can be positioned relative to and in order to create a center of gravity 119 for stable flight having the desired characteristics. In another aspect, the center of gravity may differ from the position shown.

In one aspect, as shown in FIG. 6, the lower end 512 of the front landing gear 510 can be offset from a lower end 522 of the rear landing gear 520 by an offset distance 505. In another aspect, the lower end 512 of the front landing gear 510 can be aligned with a lower end 522 of the rear landing gear 520 such that the horizontal portion 516 of the front landing gear 510 and a horizontal portion 526 of the rear landing gear 520 are coplanar or are otherwise configured to land "flat-footed" on a flat landing surface. In such aspect, the offset distance 505 can be zero.

Figure 8:
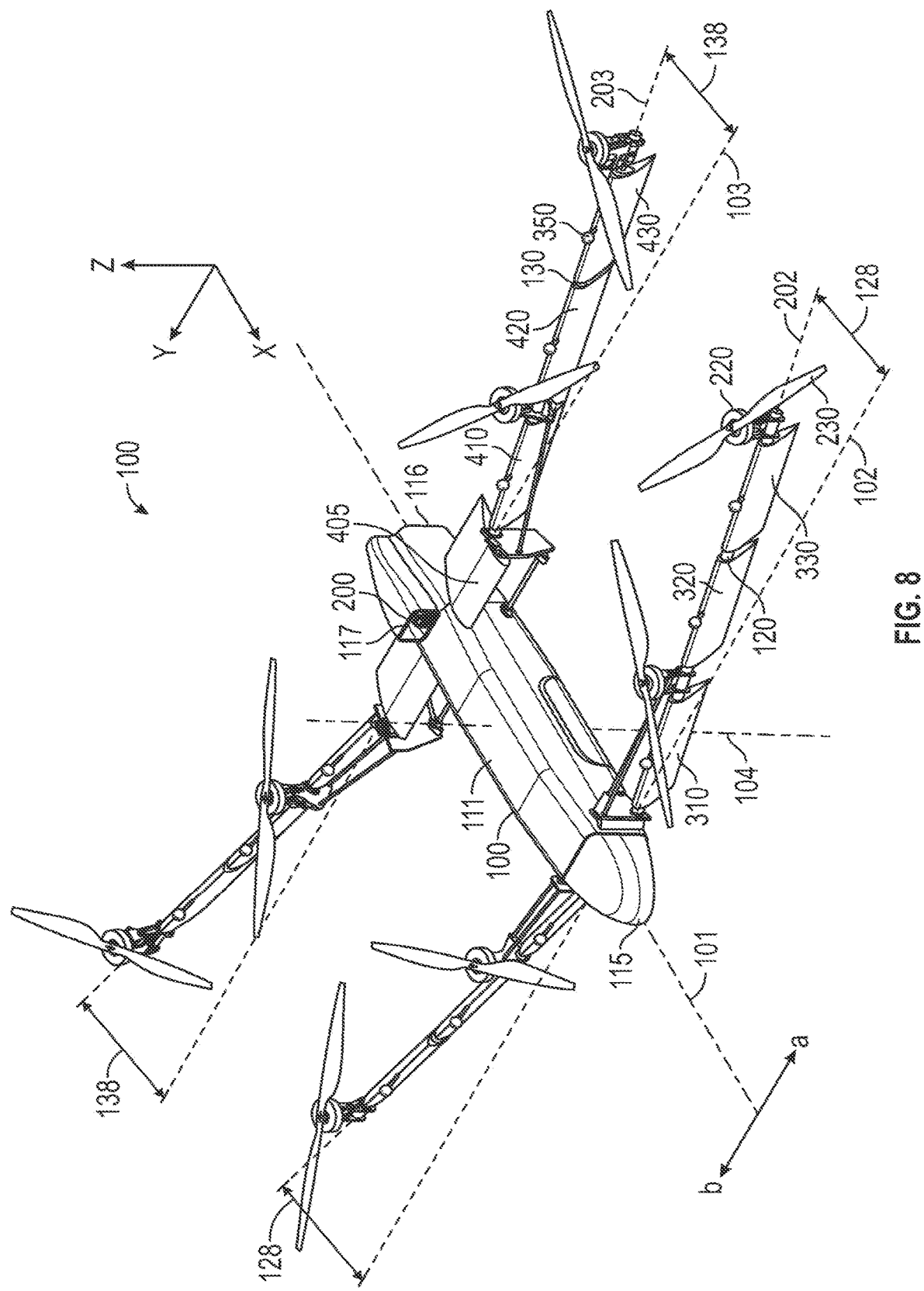
FIG. 8 is a top perspective view of a UAV in accordance with another aspect of the current disclosure.

FIGS. 8-27 show the UAV 100 in accordance with another aspect of the current disclosure. In one aspect, as shown in FIG. 8, respective boom axes 202,203 of the first support boom 120 and the second support boom 130 can be swept towards the rear by respective sweep angles 128,138. Adjusting the sweep angles 128,138 can adjust a center of lift of the rotors 230 to account for changes in center of gravity of the UAV 100 towards the rear (as shown) or towards the front (with a sweep in the opposite direction) and thereby can facilitate various configurations of the UAV 100 or its cargo (not shown). Moreover, as shown, the UAV 100 can be configured to handle a much wider range of centers of gravity than a UAV without a variable sweep angle 128,138, with adjustment made simply by swapping out the spacers that fix the sweep angles 128,138. In another aspect, just the first support boom 120 or the second support boom 130 can be so configured. In one aspect, the sweep angles 128,138 can be the same. In another aspect, the sweep angles 128,138 can vary.

As shown, the UAV 100 can further comprise a pair of first intermediate fairings 320 rotatably coupled to the first support boom 120. As shown, the UAV 100 further can further comprise a pair of fixed fairings 405 coupled to the vehicle body 110 proximate to the attachment of the second support boom 130.

In one optional aspect, each of the first support boom 120, the second support boom 130, and other features disclosed herein can comprise two halves comprising a first side and a second side corresponding respectively to a left side 100a and a right side 100b of the UAV 100. For example, the first support boom 120 can comprise a first support boom 120a on the left side 100a of the UAV 100 and a first support boom 120b on the right side 100b of the UAV 100.

Figure 9:
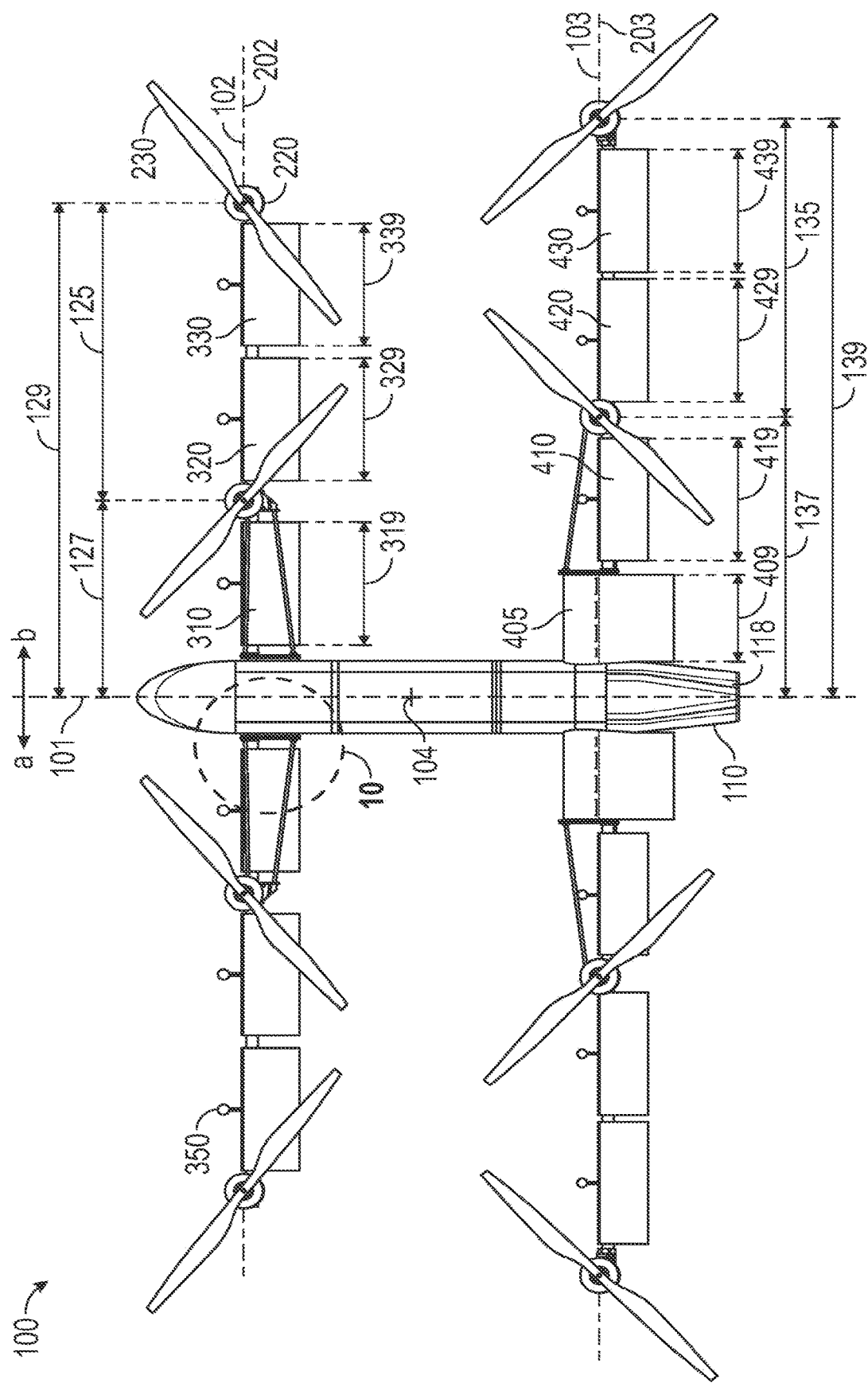
FIG. 9 is a top view of the UAV of FIG. 8 in accordance with another aspect of the current disclosure.

As shown in FIG. 9, each of the first intermediate fairings 320 and the fixed fairings 405 can be said to have respective fairing lengths 329,409 as measured parallel to a one of the transverse axis 102 and the transverse axis 103. As previously described, each central axis of the rotors 230 that are coupled to the first support boom 120 can be staggered with respect to each central axis of the rotors 230 coupled to the second support boom 130. Also shown, the boom axes 202,203 can be made to align with the transverse axes 102,103 such that the sweep angles 128,138 (shown in FIG. 8) measure zero degrees.

Figure 10:
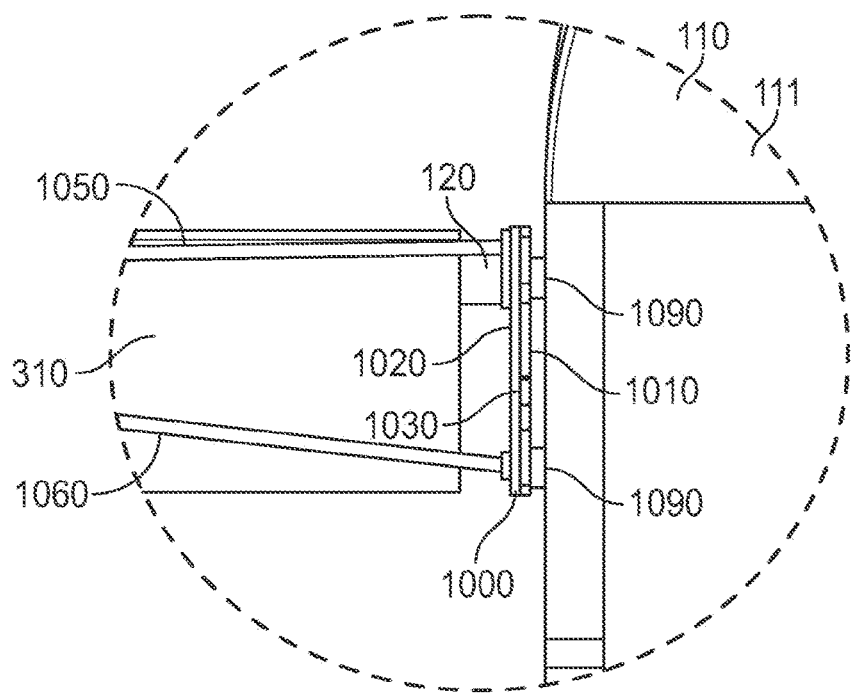
FIG. 10 is a detail view of a front boom attachment system of the UAV of FIG. 9 taken from detail 10 of FIG. 9.
Figure 11:
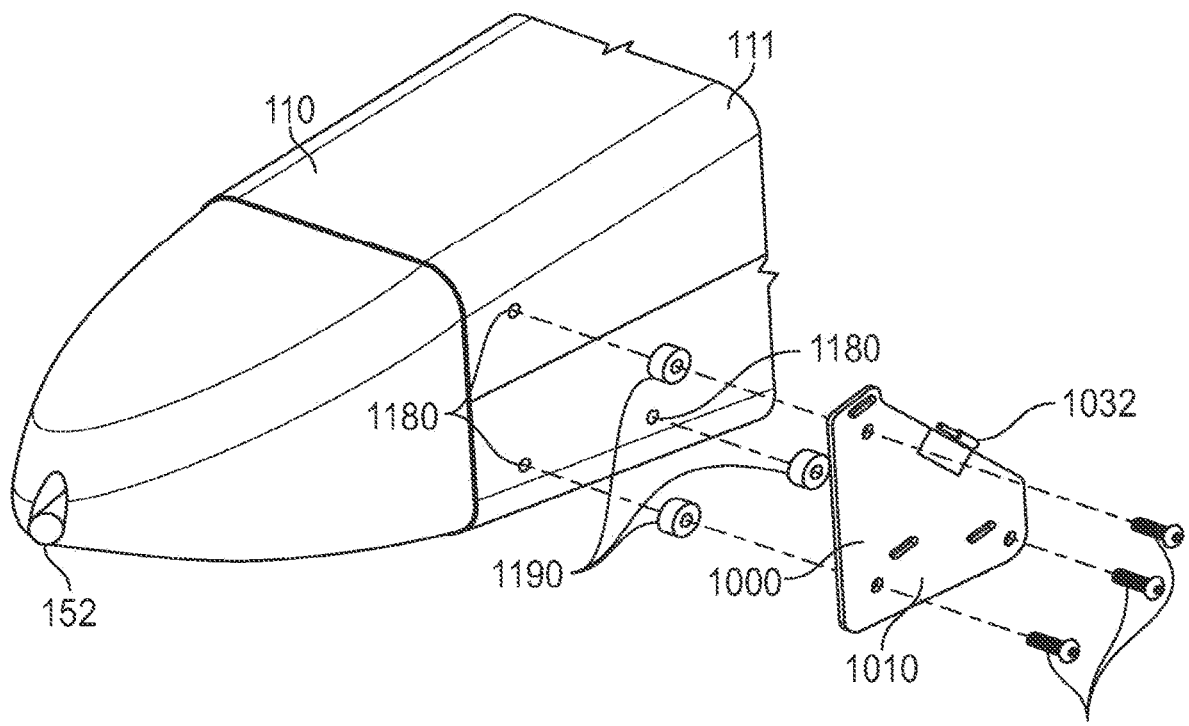
FIG. 11 is an exploded view of the front boom attachment system of FIG. 10.

As shown in FIGS. 10 and 11, the first support boom 120 can be coupled to the vehicle body 110 with a first boom attachment system 1000, which can be a front boom attachment system. The first boom attachment system 1000 can comprise an inboard plate 1010 secured to mounting holes 1180 defined in the vehicle body 110 with fasteners 1190. The mounting holes 1180 can be sized and threaded to fixedly receive the fasteners 1190, which can also be threaded. The first boom attachment system 1000 can further comprise an outboard plate 1020, which can be removably coupled to the inboard plate 1010 with the fasteners 1190 or with separate fasteners as will be described.

In one aspect, the outboard plate 1020 can be aligned or otherwise positioned adjacent to the inboard plate 1010 with a hinge 1030, which can comprise a first hinge portion 1032 secured to the inboard plate 1010 and a second hinge portion 1034 secured to the outboard plate 1020. As shown, the hinge 1030 can be a flag hinge in which the second hinge portion 1034 (shown in FIG. 14) can be lifted off the first hinge portion 1032.

Each of the inboard plate 1010 and the outboard plate 1020 can define any polygonal shape including the roughly triangular shape shown, and attachment holes sized to receive the fasteners 1190 can be defined anywhere on the inboard plate 1010—including in positions proximate to corners of the inboard plate 1010—to maximize the rigidity of the first boom attachment system 1000 when assembled. The connection between the first support boom 120 and the outboard plate 1020 can be reinforced by a first stay 1050 and a second stay 1060, each of which can be a forward stay. Each of the first stay 1050 and the second forward stay 1060 can extend between the outboard plate 1020 and the first support boom 120 to form a roughly triangular structure configured to minimize or eliminate movement of the first support boom 120 relative to the outboard plate 1020. The rigidity of the roughly triangular structure formed by the first support boom 120, the outboard plate 1020, and the respective stay 1050,1060 can be ensured by sizing each of the three elements and their respective connections with each other as desired.

A spacer 1090, or optionally a plurality of spacers 1090, can be positioned or even sandwiched between the inboard plate 1010 and the vehicle body 110. In one aspect, the spacer 1090 can measure a constant thickness or each of the plurality of spacers 1090 can have the same thickness such that the inboard plate extends along a longitudinal direction of the vehicle body 110 of the UAV 100.

Also as shown, the UAV 100 can comprise a camera 152 extending from an opening defined in the first end 115 of the vehicle body 110.

Figure 12:
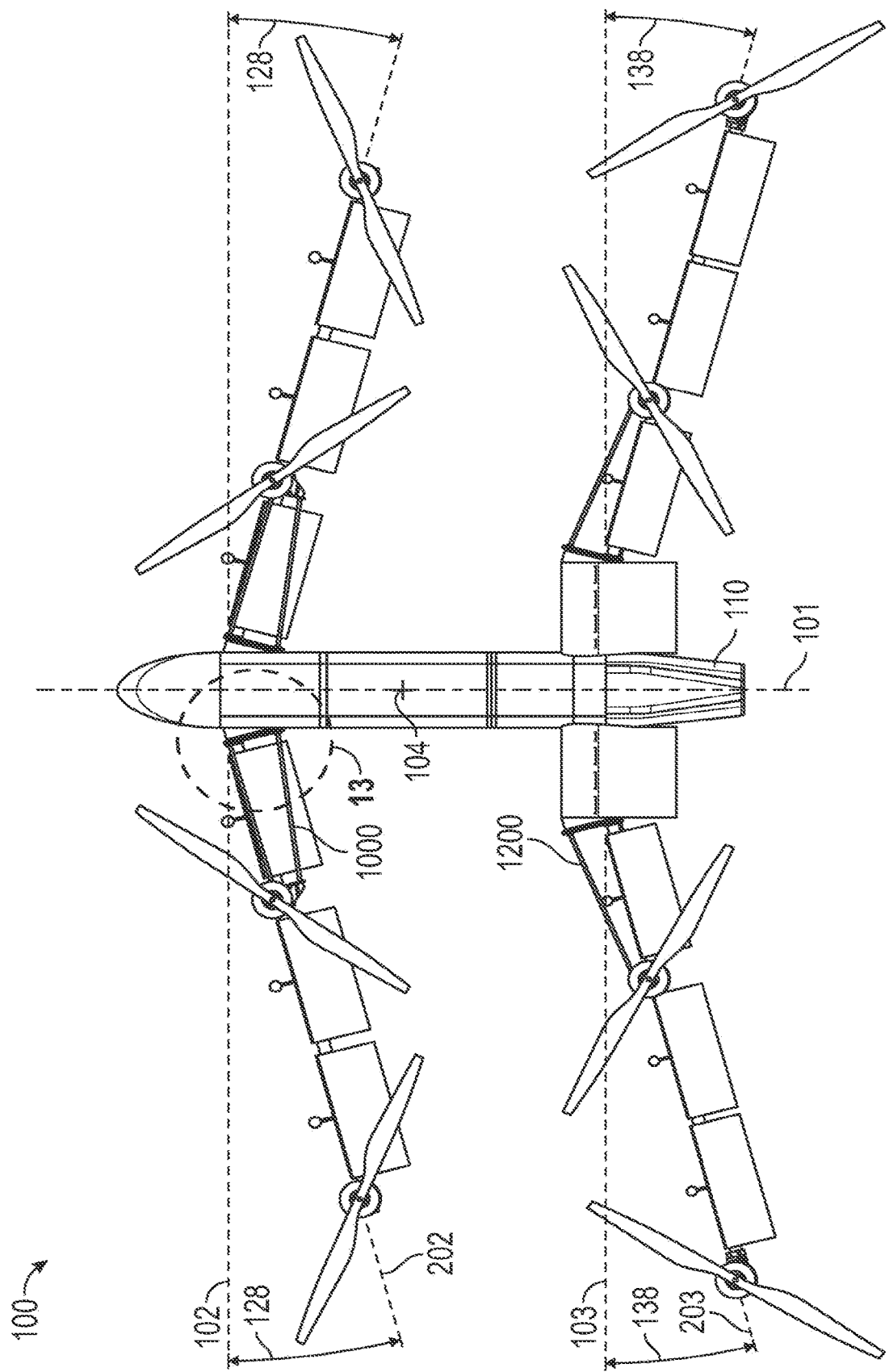
FIG. 12 is a top view of the UAV of FIG. 8.

As shown in FIG. 12, the second support boom 130 can be coupled to the vehicle body 110 with a second boom attachment system 1200, which can be a rear boom attachment system.

Figure 13:
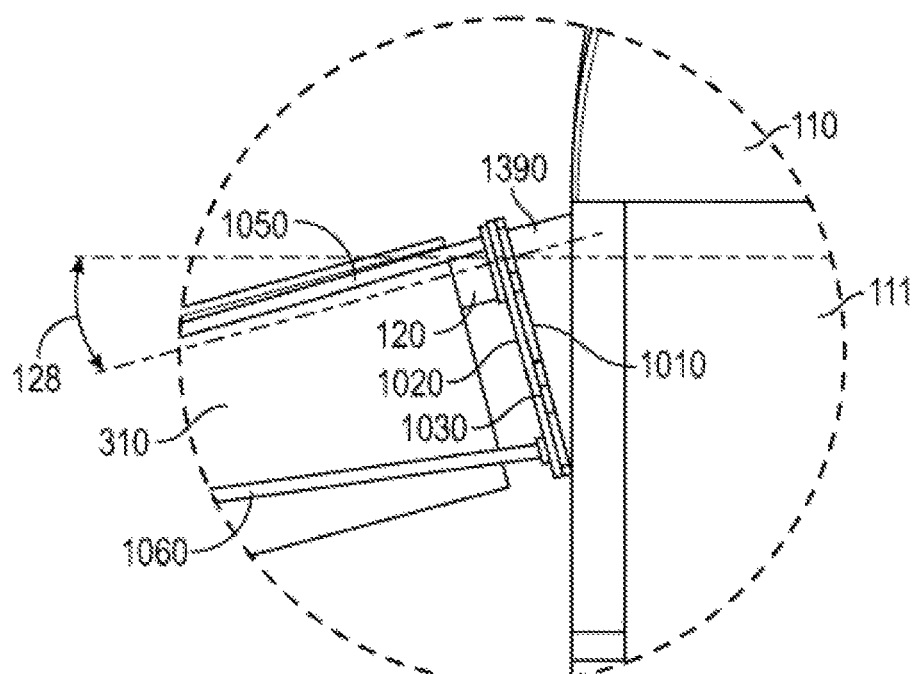
FIG. 13 is a detail view of the front boom attachment system of the UAV of FIG. 8 taken from detail 13 of FIG. 12.
Figure 14:
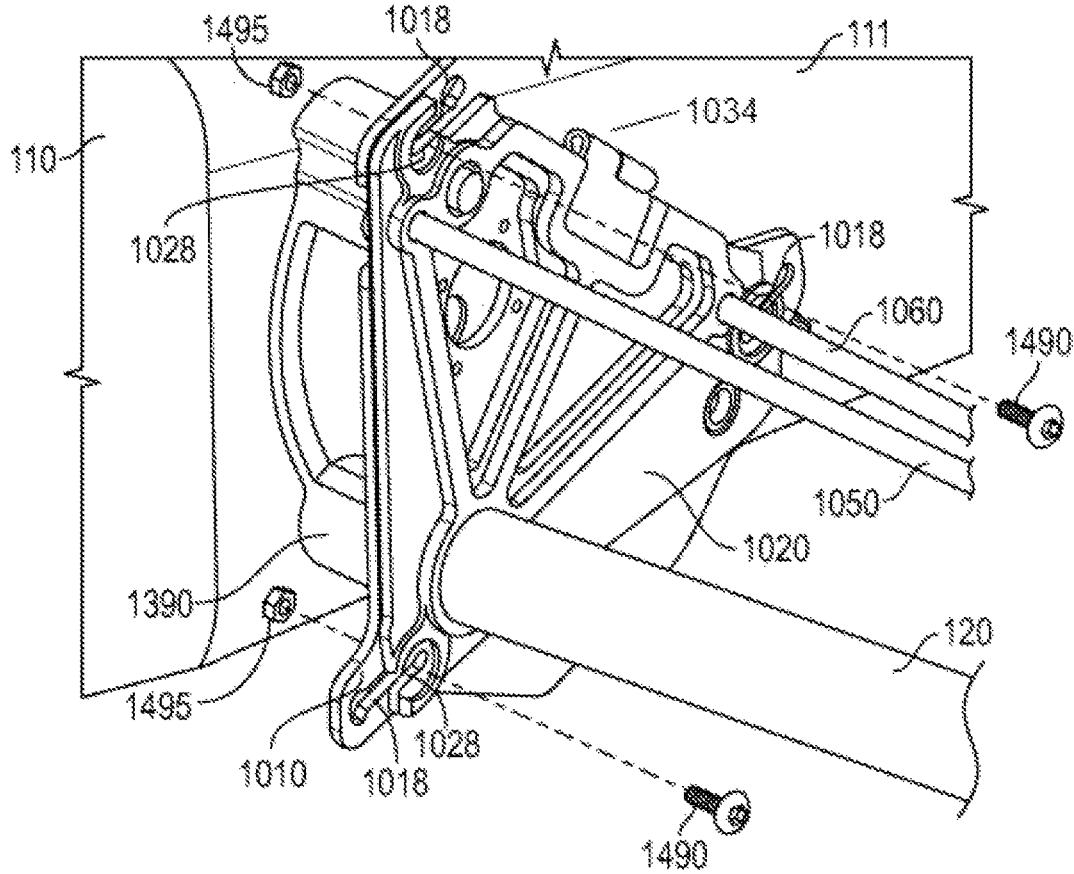
FIG. 14 is a front perspective view of the front boom attachment system of FIG. 13 in accordance with another aspect of the current disclosure.
Figure 15:
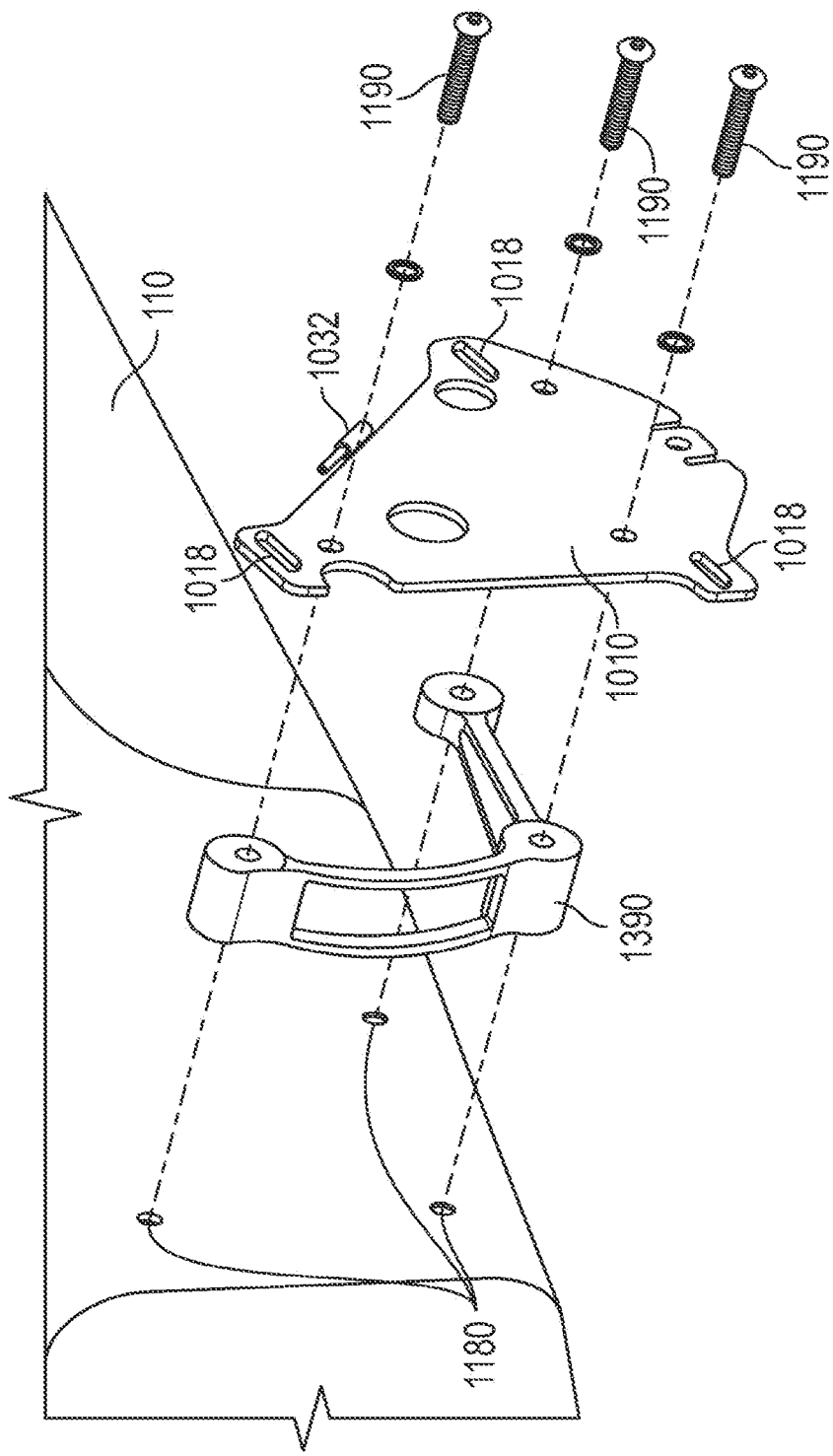
FIG. 15 is an exploded view of the front boom attachment system of FIG. 14.

FIGS. 13-15 shows the first boom attachment system 1000 in a condition where the exemplary sweep angle 128 is non-zero. As shown in FIG. 13, a spacer 1390 can be used to create such a non-zero sweep angle 128. As shown in FIG. 14, the inboard plate 1010, the outboard plate 1020, and/or the spacer 1390 can be sized or shaped differently for various purposes such as, for example and without limitation, strength, weight savings, or serviceability. The inboard plate 1010 can define a plurality of holes 1028, which can be slotted holes, and the outboard plate 1020 can define a plurality of matching holes 1028, which can be slotted holes. Fasteners 1490, each of which can comprise a nut 1495, can be used to secure the outboard plate 1020 to the inboard plate 1010. Each of the holes 1018,1028 can be slotted to facilitate disconnection of the outboard plate 1020 from the inboard plate 1010 without disassembly of the fasteners 1490. In such aspect, the fasteners 1490 can be loosened enough for each to be moved away from the assembled position shown. FIG. 15 shows an exploded view of the first boom attachment system 1000 with the first support boom 120 and associated parts including the outboard plate 1020 removed for clarity.

Figure 16:
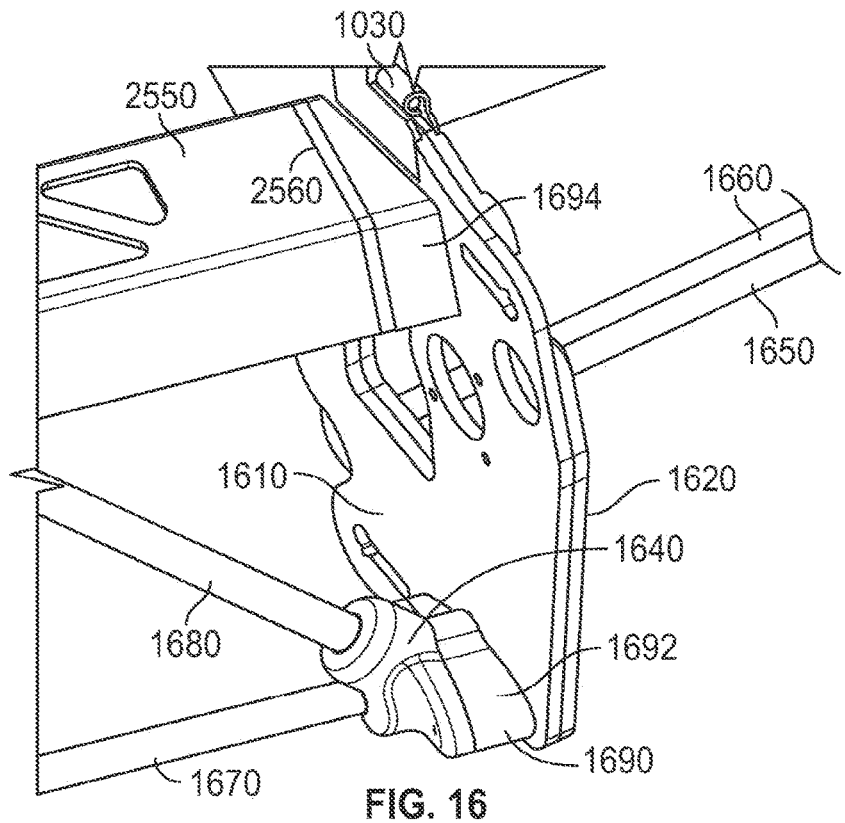
FIG. 16 is a front perspective view of a rear boom attachment system of the UAV of FIG. 8.

As shown in FIG. 16, the second boom attachment system 1200 can comprise an inboard plate 1610 secured to mounting holes (not shown) defined in a frame tube 2550 of the vehicle body 110 or other portion of the vehicle body 101 with fasteners (not shown). The mounting holes can be sized and threaded to fixedly receive threaded fasteners. The first boom attachment system 1000 can further comprise an outboard plate 1620, which can be removably coupled to the inboard plate 1610 with the fasteners used to secure the inboard plate 1610 to the vehicle body 110 or with separate fasteners. In one aspect, the outboard plate 1620 can be aligned or otherwise positioned adjacent to the inboard plate 1610 with the hinge 1030.

Each of the inboard plate 1610 and the outboard plate 1620 can define any polygonal shape including the roughly trapezoidal shape shown, and attachment holes sized to receive the fasteners corresponding to the fasteners 1190 used to secure the inboard plate 1010 of the first boom attachment system 1000 can be defined anywhere on the inboard plate 1610 including in positions proximate to corners of the inboard plate 1610 to maximize the rigidity of the first boom attachment system 1000 when assembled. The connection between the second support boom 130 and the outboard plate 1620 can be reinforced by a first stay 1650 and a second stay 1060, each of which can be a rear stay. Each of the first stay 1650 and the second stay 1660 can extend between the outboard plate 1620 and the second support boom 130 to form a triangular structure configured to minimize or eliminate movement of the first support boom 130 relative to the outboard plate 1620. The rigidity of the triangular structure formed by the second support boom 130, the outboard plate 1620, and the respective stay 1650, 1660 can be ensured by sizing each of the three elements and their respective connections with each other as desired. The connection between the inboard plate 1010 and the vehicle body 110 can be reinforced by a first body stay 1670 and a second body stay 1680, each of which can be a rear body stay. Each of the first body stay 1670 and the second body stay 1680 can be secured to the inboard plate 1610 and the vehicle body 110 using an outboard fitting 1640 and an inboard fitting (not shown), respectively.

A spacer 1690, or optionally a plurality of spacers 1690, can be positioned or even sandwiched between the inboard plate 1010 and the vehicle body 110. In one aspect, the spacer 1090 can measure a constant thickness, each of the plurality of spacers 1090 can have the same thickness, or the second boom attachment system 1200 can be assembled without the spacers 1090 such that the inboard plate extends along a longitudinal direction of the vehicle body 110 of the UAV 100. The spacer 1690 can comprise a lower spacer 1690 and an upper spacer 1694. An adapter 2560 can be positioned between the frame tube 2550, which can be hidden inside the fixed fairing 405 (shown in FIG. 8), and the inboard plate 1610 to facilitate coupling of the upper spacer 1694 and/or the inboard plate 1610 to the vehicle body 110.

Figure 17:
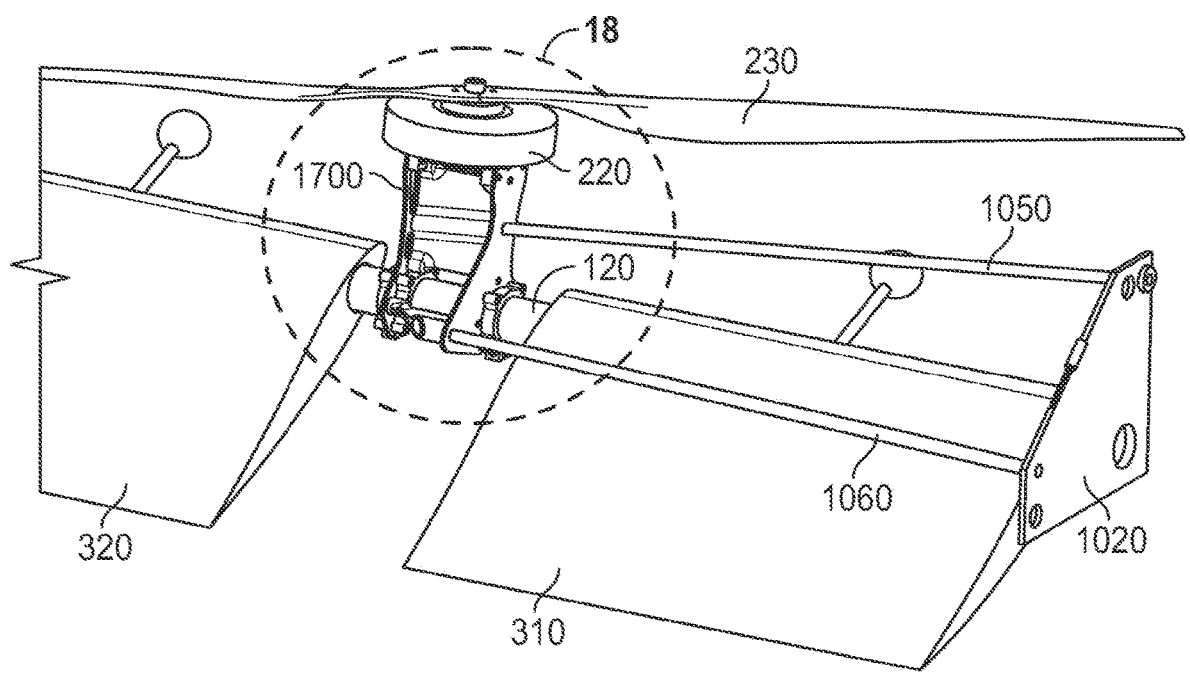
FIG. 17 is a rear perspective view of a left front boom assembly of the UAV of FIGS. 8 and 9.
Figure 18:
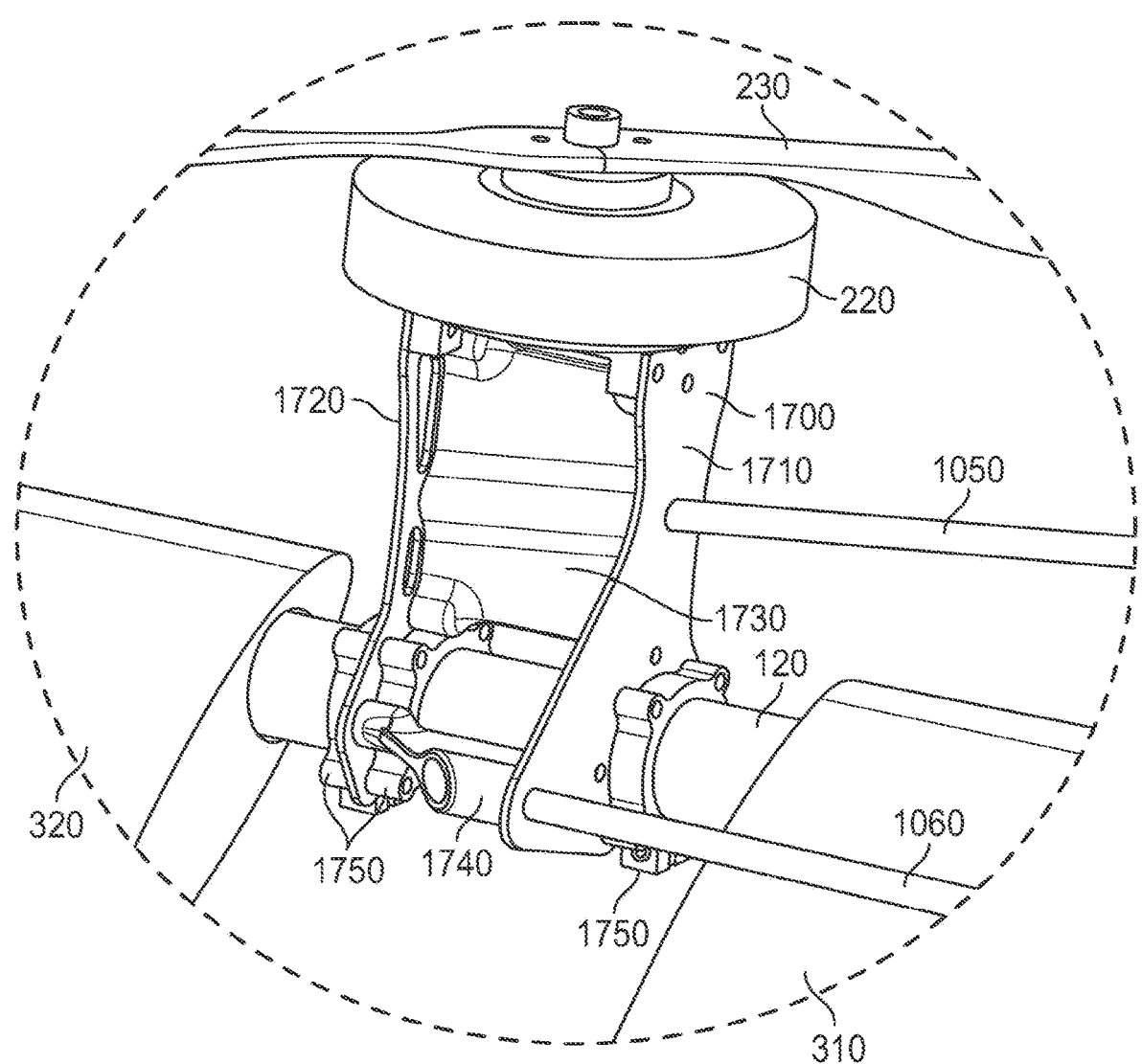
FIG. 18 is a rear perspective view of an inboard motor mounting assembly of the left front boom assembly of FIG. 17.

As shown in FIGS. 17 and 18, a motor attachment bracket 1700 can couple any one of the electric motors 220 to the first support boom 120. The motor attachment bracket 1700 can be configured to receive the first stay 1050 and the second stay 1060. As shown in FIG. 18, the motor attachment bracket 1700 can comprise a first side support 1710, a second side support 1720, each of which can be coupled to the first support boom 120 and can extend toward and supports the motor 220 at an end distal from the first support boom 120. The motor attachment bracket 1700 can further comprise a first spreader 1730, to which the first stay 1050 can be secured, and a second spreader 1740, to which the second stay 1060 can be secured. Each of the first spreader 1720 and the second spreader 1740 can extend from the first side support 1710 to the second side support 1720. In one aspect, an anti-rotation feature such as, for example and without limitation, a clamp 1750, can be coupled to the first side support 1710 or the second side support 1720 and secured about the first support boom 120 to prevent rotation of the motor attachment bracket 1700 relative to the first support boom 120. As shown, a plurality of the clamps 1750, which can be called "clamping hubs," can be used to secure the motor attachment bracket 1700 to the first support boom 120. Each of the claims 1750 can be secured to the side supports 1710,1720 with fasteners and can be tightened about the first support boom 120 with fasteners.

Figure 19:
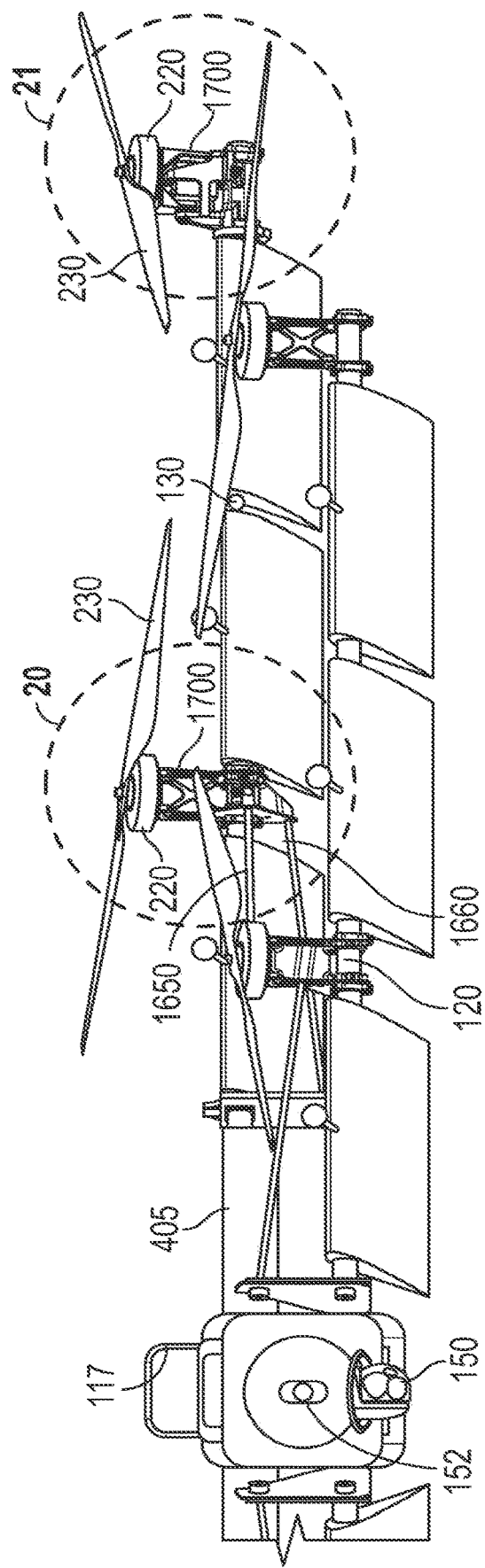
FIG. 19 is a partial front view of a left side of the UAV of FIG. 8, which is a mirror image of a right side of the UAV.
Figure 20:
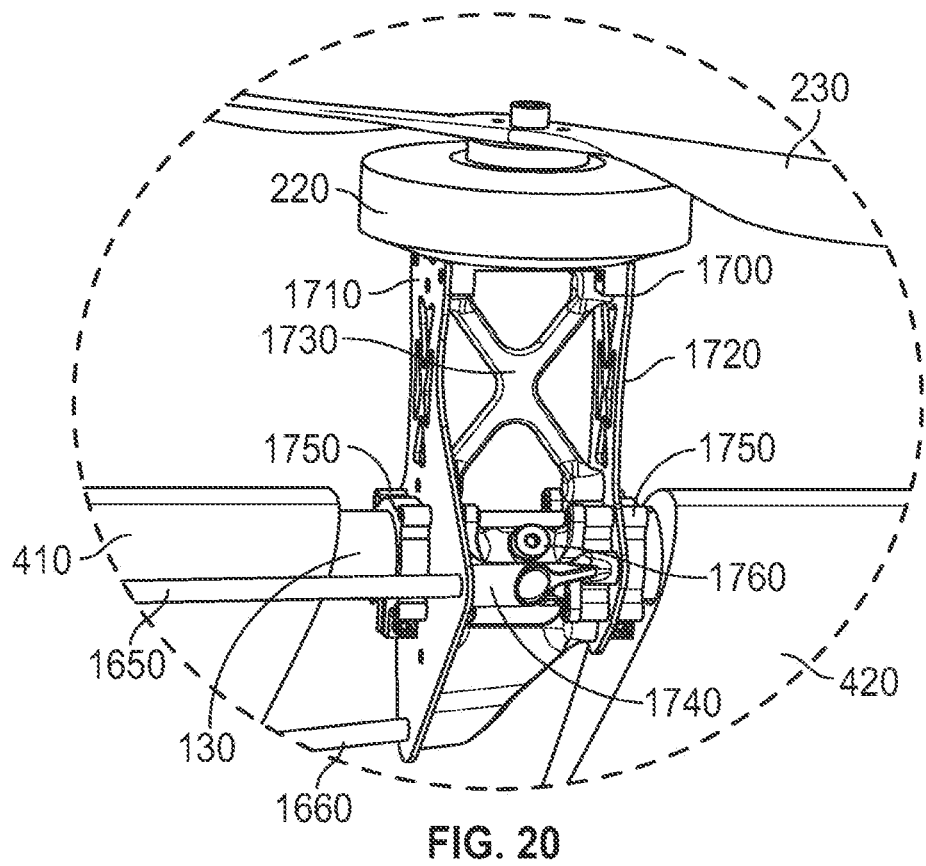
FIG. 20 is a front perspective view of an inboard motor mounting assembly of the left rear boom assembly of the UAV of FIG. 8 taken from detail 20 of FIG. 19.
Figure 21:
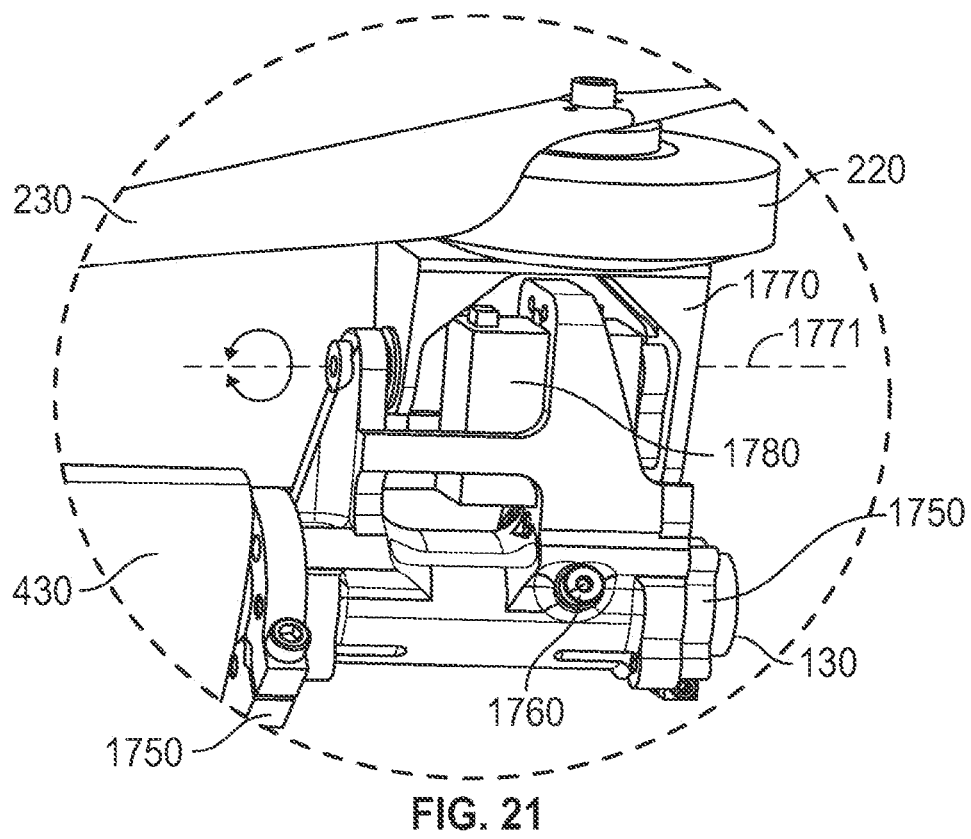
FIG. 21 is a front perspective view of an outboard motor mounting assembly of the left rear boom assembly of the UAV of FIG. 8 taken from detail 21 of FIG. 19.

As shown in FIGS. 19-21, the motor attachment bracket 1700 can couple any one of the electric motors 220 to the second support boom 130. As shown in FIG. 20, the motor attachment bracket 1700 can comprise an anti-rotation fastener 1760, which can be configured to extend partially or completely through the second support boom 130—or the corresponding attachment bracket 1700 into the first support boom 120—to prevent rotation of the motor attachment bracket 1700 relative to the second support boom 130—or to prevent rotation of the motor attachment bracket 1700 relative to the first support boom 120 as desired. As shown, the first stay 1650 can be secured to the second spreader 1740, and the second stay 1660 can be secured to a third spreader 1760, which can be positioned below the second support boom 130.

As shown in FIG. 21, the motor attachment bracket 1700 can comprise a rotating motor mount 1770, which can be actuated about a mount axis 1771 by an actuating device such as a servo 1780.

Figure 24:
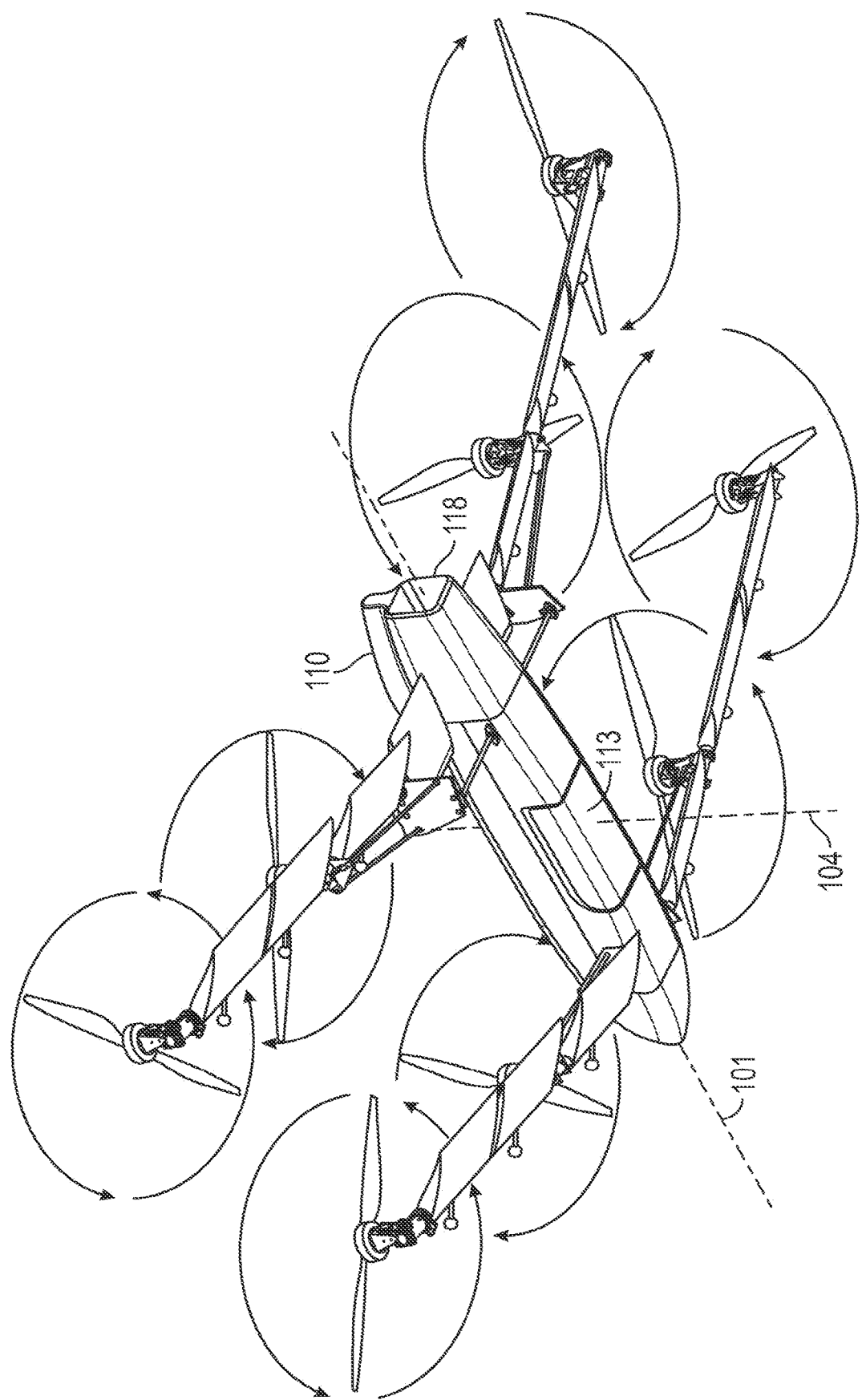
FIG. 24 is a rear bottom perspective view of the UAV of FIG. 8.

FIGS. 22-24 show the UAV 100 in forward edgewise flight with the longitudinal axis of the vehicle body 110 aligned with the direction of travel of the UAV. As shown, the vehicle body 110 can comprise a cargo hatch cover 113 and an aft access panel 114. The cargo hatch cover 113 can be removed to provide access to the interior cavity of the vehicle body 110 for storage and/or installation of equipment and/or cargo as desired.

As shown in FIG. 24, the first support boom 120 can have a first portion 120a extending outwardly towards the left from one longitudinal side of the vehicle body 110 and a second portion 120b extending outwardly towards the right from the opposing longitudinal side of the vehicle body 110. First and second pairs of electric motors 220 of the plurality of electric motors 220 can be positioned adjacent to each other on each of the respective first portion 120a and second portion 120b of the first support boom 120. As shown, the rotation directions of the rotors 230 coupled to the respective first and second pairs of electric motors 220 can be in opposition for each pair of electric motors 220, i.e., each pair of adjacent electric motors 220 can be configured to drive the corresponding rotors 230 in opposite directions.

Figure 25:
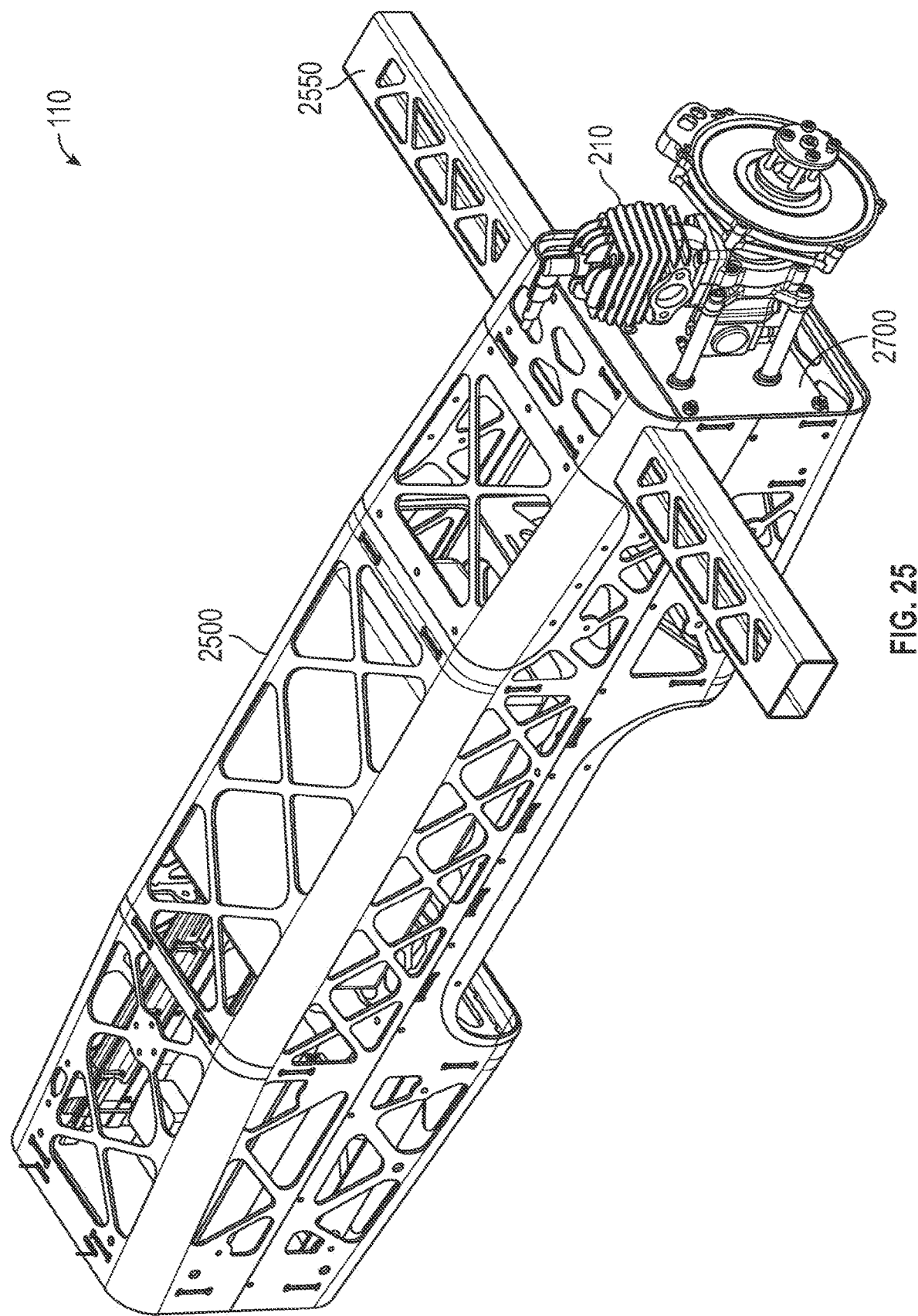
FIG. 25 is a perspective view of a portion of a vehicle body of the UAV of FIGS. 8 and 9 showing a frame, a rear beam, an engine, and various other internal components of the UAV.

As shown in FIG. 25, the vehicle body 110 can comprise a body frame 2500 and the frame tube 2550. A rear end of the frame 2500 can be configured to receive a vibration isolation system 2700 connecting the engine 210 to the body frame 2500.

Figure 26:
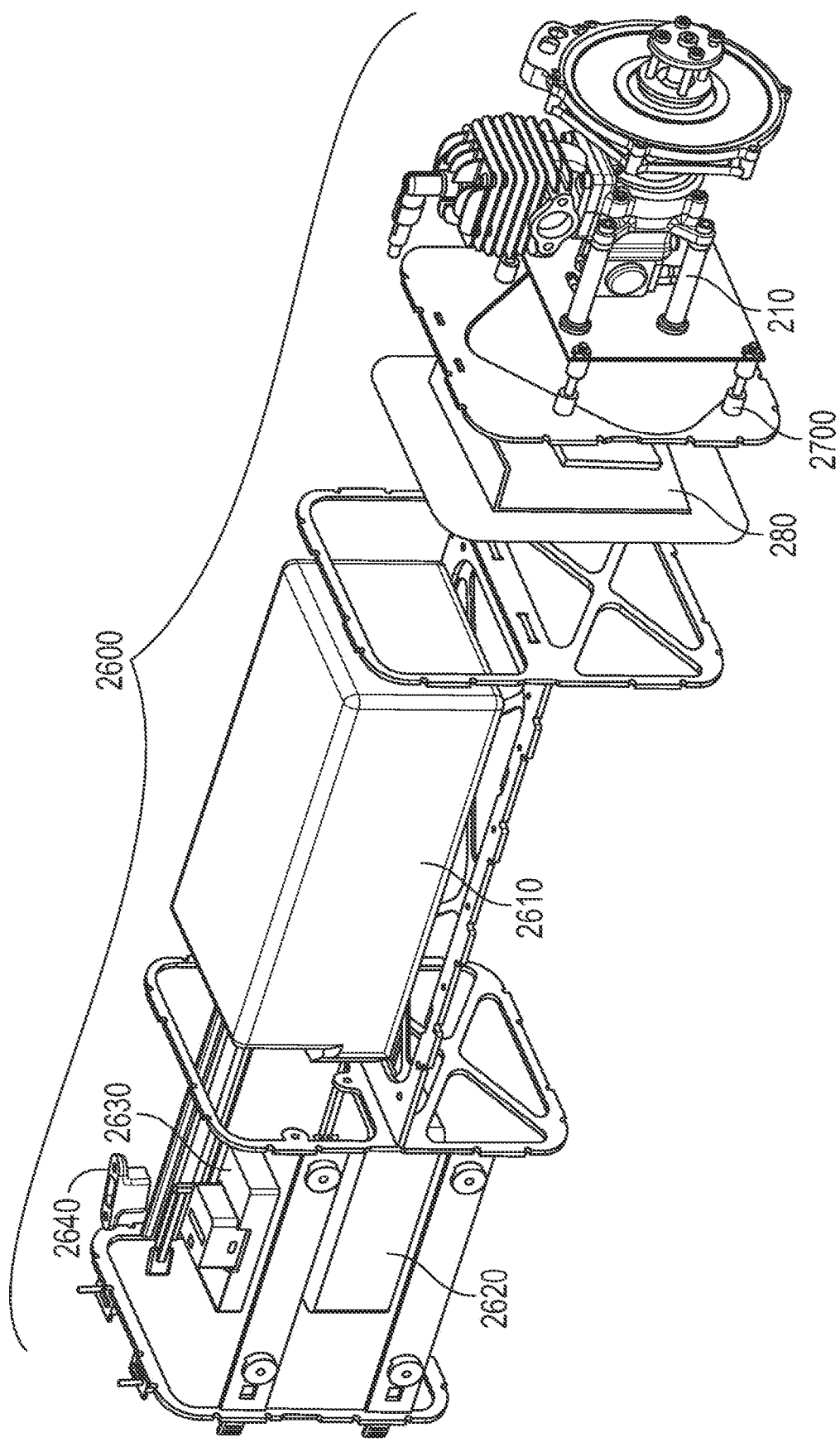
FIG. 26 is a rear perspective view of the engine and various internal components of the assembly of FIG. 25.

As shown in FIG. 26, the UAV 100 can comprise a fuel tank 2610, a battery 2620, a kill switch 2640, the combustion engine 210, and an electrical rectifier (not shown). The battery can be a 3300 mAh 25.9 V lithium-ion polymer battery like that available from Thunder Power of Las Vegas, Nevada. The UAV 100 can further comprise an autopilot (not shown) such as, for example and without limitation, a Pixhawk 2 obtainable from a manufacturer such as Hex of Xiamen, Fujian Province, China.

Figure 27:
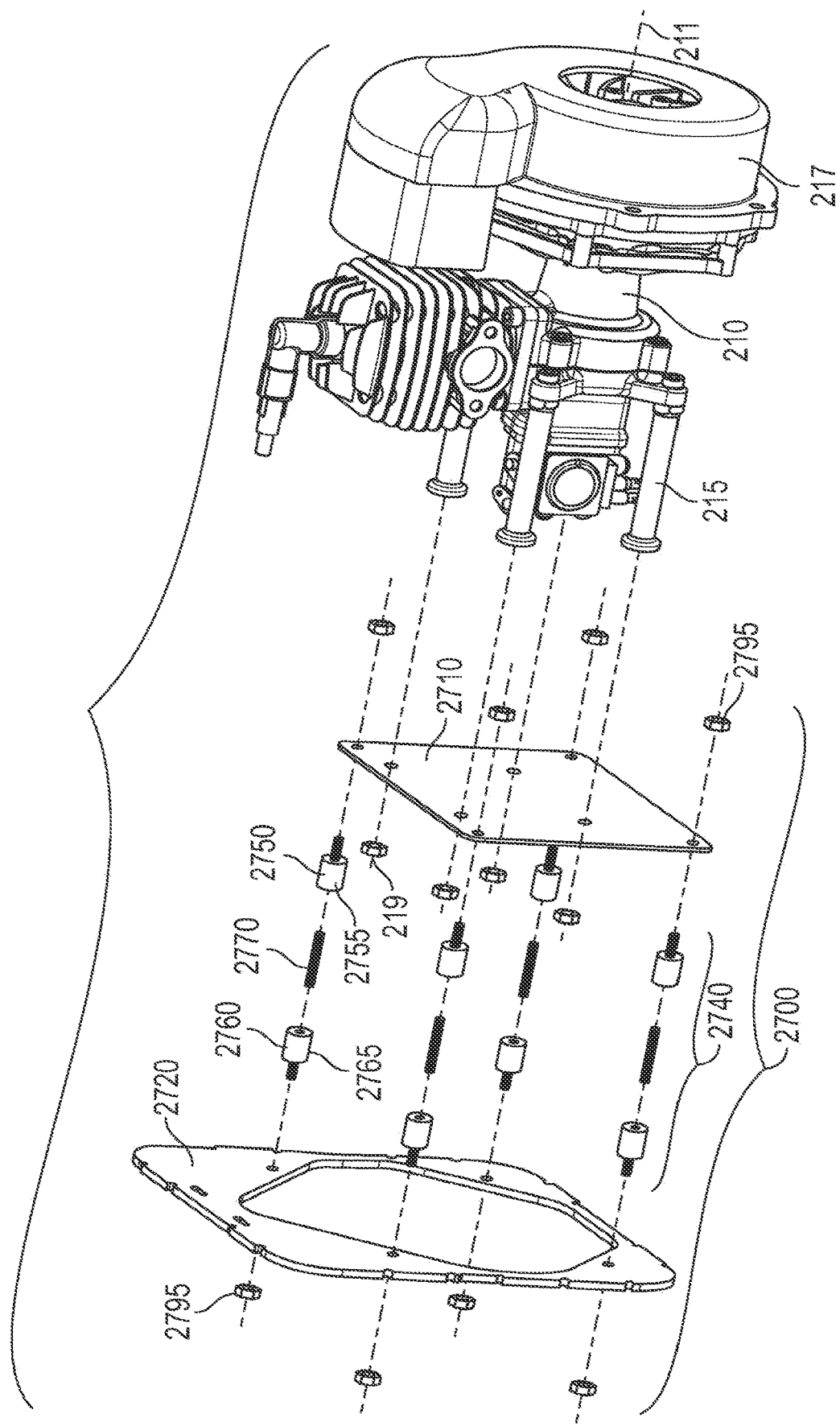
FIG. 27 is an exploded view of the engine and a vibration isolation system of FIG. 25.

As shown in FIG. 27, the vibration isolation system 2700 can comprise an engine mounting plate 2710 and a body mounting plate 2720. The body mounting plate 2720 can be secured to the vehicle body 110, and the engine 210, shown with an engine shroud or engine cowling 217, can be secured to the engine mounting plate 2710 with a plurality of engine standoff fasteners 215. Each of the plurality of engine standoff fasteners 215 can comprise a nut 219. The engine mounting plate 2710 can be secured to the body mounting plate 2720 by a plurality of vibration isolation spacers 2740. Each of the vibration isolation spacers 2740 can comprise a first spacer 2750, a second spacer 2760, and a connecting portion 2770 that can connect the first spacer 2750 and the second spacer 2760. Each of the first spacer 2750 and the second spacer 2760 can be secured through and to the engine mounting plate 2710 and the body mounting plate 2720, respectively, and held in place with a nut 2795. Each of the first spacer 2750 and the second spacer 2760 can comprise a body 2755, 2765 formed from an elastomeric material such as, for example and without limitation, rubber or ethylene propylene diene monomer (EPDM). The body 2755, 2765 can absorb vibration.

The vibration isolation system 2700 can therefore be configured to reduce vibration transferred from the propulsion system 200 to the vehicle body 110. More specifically, in one aspect, the vibration isolation system 2700 can be configured to allow vibrational movement of the engine in the Y-Z plane but substantially restrain movement in the X-axis direction. In another aspect, the vibration isolation system 2700 can be configured to allow vibrational movement of the engine 210 in the plane in which a crank shaft (not shown) of the engine 210 rotates and tightly constrain the freedom of movement in any other degrees of freedom. Stated differently, the vibration isolation spacers 2740 can be "soft" in torque about the X-axis and stiff in the other degrees of freedom. As shown, the crankshaft can rotate about the motor axis 211, which can be aligned with an X-axis direction, and such rotation of the crankshaft can cause mechanical loads and therefore vibration in the Y-Z plane. Reducing the transfer of vibration from the engine 210 into the vehicle body 210 can be desirable because, for example and without limitation, the sensors which may be on the UAV 100 for the acquisition of data may be affected by vibration, and small combustion engines like the engine 210 can be a significant source of vibration. For example, and without limitation, reduced vibration can reduce in higher quality imagery taken by the cameras 150 or 152.

Figure 28:
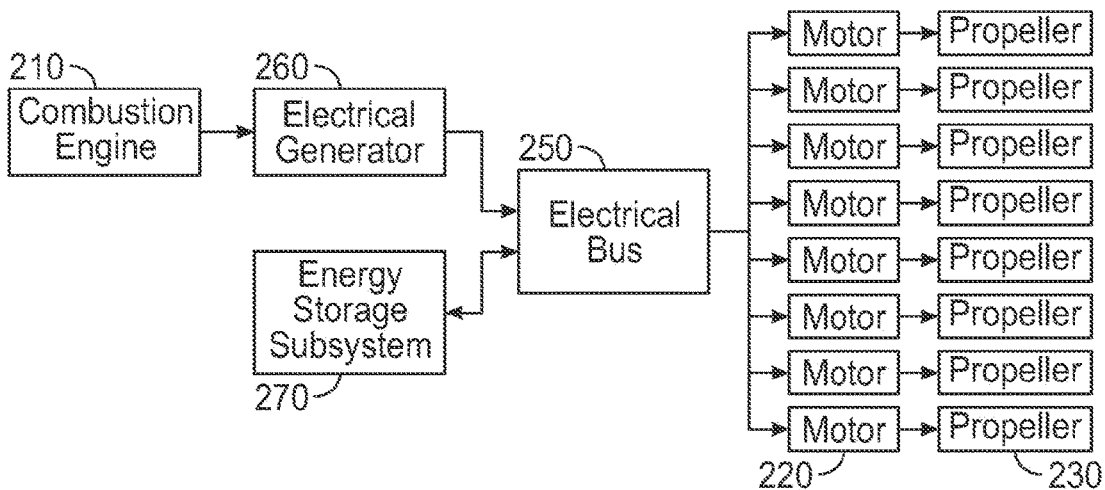
FIG. 28 is a schematic of a hybrid propulsion system of the UAV of FIG. 1 in accordance with one aspect of the current disclosure.
Figure 29:
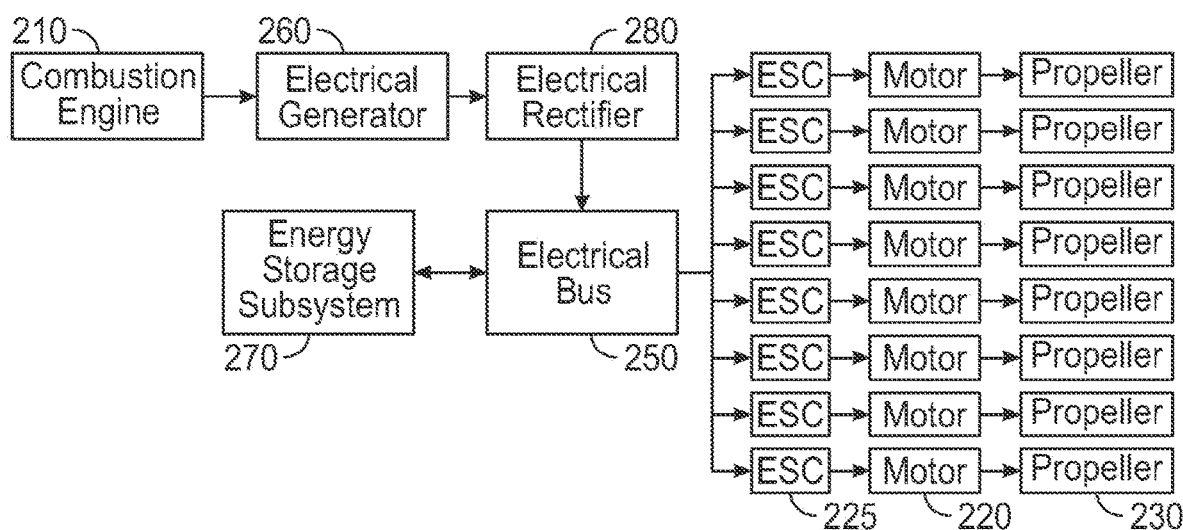
FIG. 29 is a schematic of a hybrid propulsion system of the UAV of FIG. 1 in accordance with another aspect of the current disclosure.

FIGS. 28 and 29 show schematics of the propulsion system 200. As shown in FIG. 28, each of the plurality of rotors 230 can be coupled to a respective one of the plurality of electric motors 220, and each of the plurality of electric motors 220 can be electrically coupled to the electrical bus 250. In addition, the electrical bus 250 can coupled to an outlet of the combustion engine 210 via an electric generator 260. In one aspect, power conditioning electronics, which can be in the form of an electrical rectifier 280 (shown in FIG. 29), can provide power conditioning to an electrical output of the electrical generator 260 to convert such electrical output into regulated direct current (DC) electrical power. In one aspect, an energy storage subsystem 270 electrical coupled to the electrical bus 250 and the electrical generator 260 can add capacitance to the system by storing energy—such as surplus electrical charge generated by the electrical generator 260—that can later be used by the propulsion system 200. In one aspect, the energy storage subsystem 270 can comprise at least one battery. It is contemplated that surplus electrical charge can be used, for example and without limitation, when the combustion engine 210 ceases operation due to lack of fuel or when additional power is desired beyond that which can be provided by the combustion engine 210 alone. In such aspect, including when it is desirable to carry a high-value payload, the energy storage subsystem 270 can be made capable of powering the electric motors 220 for a desired predetermined period of time, thus allowing a safe landing if the combustion engine 210 ceases operation. In one aspect, the electrical generator 260 can be mechanically coupled directly to the combustion engine 210. In another aspect, the electrical generator 260 can be mechanically coupled indirectly to the combustion engine 210. In one aspect, the electrical bus 250 can connect the electrical generator 260, the energy storage subsystem 270, and the electric motors 220. In one aspect, as shown in FIG. 28, each of the electric motors 220 can be controlled by a common controller (not shown) configured to separately control the speed of each. In another aspect, as shown in FIG. 29, each of a plurality of electronic speed controllers (ESC) 225 can be used to separately control the speed of each of the electric motors 220.

Figure 30:
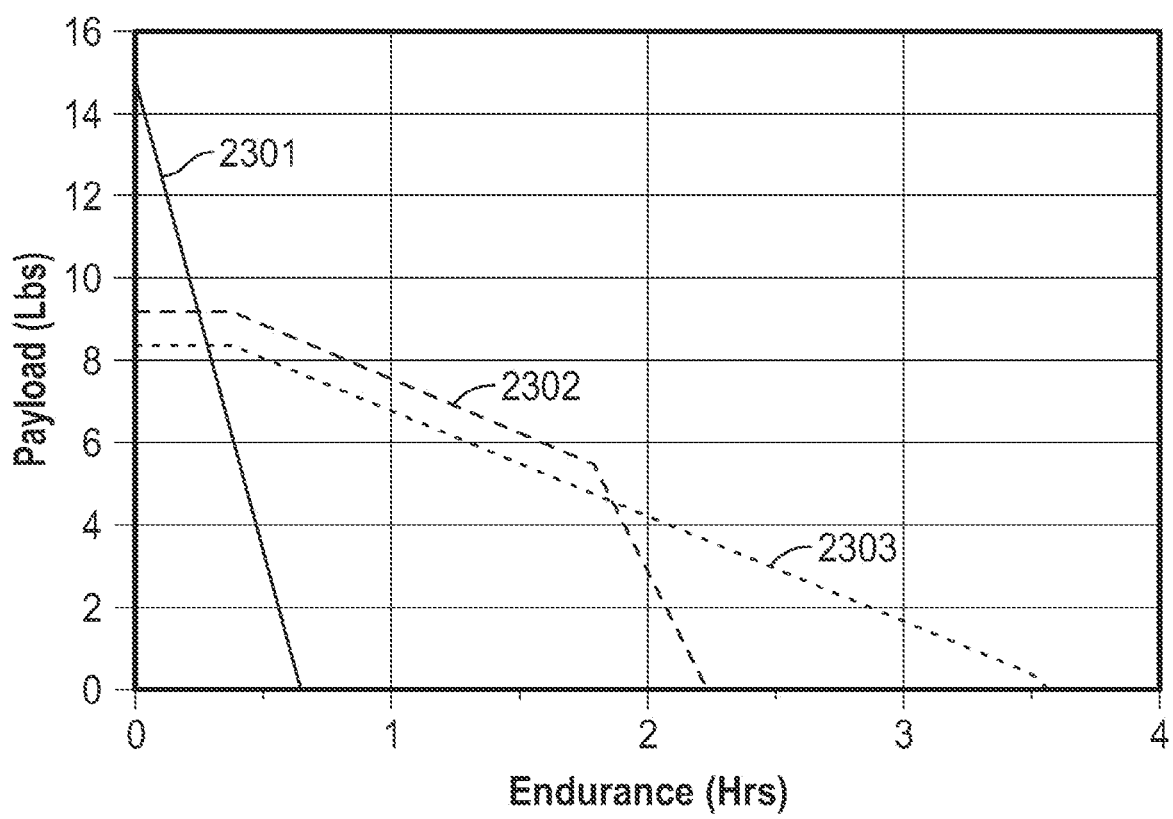
FIG. 30 is a graph of flight endurance versus payload weight for two configurations of the UAV of FIG. 1 and for another UAV.

FIG. 30 shows a comparison chart that charts flight duration or endurance in hours of flight versus payload weight in pounds—including fuel—for the UAV 100 and a similar-size competitor's large octo-rotor (i.e., a UAV comprising eight rotors) that does not utilize a hybrid propulsion system or any of the other improvements disclosed herein. Two configurations of the UAV 100 are plotted—one UAV 100 with a single fuel tank as shown by the endurance curve 2302 and another UAV 100 with two fuel tanks as shown by the endurance curve 2303. The design of the UAV 100 in either configuration plotted significantly improves range and endurance over competitors' multi-rotor VTOL UAVs. For missions greater than 15 minutes, the UAV 100 has vastly superior performance relative to existing large multi-rotors, one example of which can be in flight for only about 17 minutes with a payload of about 8-9 pounds, as shown by the endurance curve 2301. The significant performance improvement is enabled because the UAV 100, which in one aspect can have a gross weight of about 36 pounds (including fuel and any other payload), utilizes an advanced aerodynamic design and the propulsion system 200 of a series hybrid variety that enables more than six times improvement in range and endurance over other products on the market. In such aspect, the UAV 100 has an overall length of 56 inches and an overall span of 155 inches. In another aspect, the UAV 100 has a gross weight above or below about 36 pounds, an overall length greater than or less than 56 inches, and an overall span greater than or less than 155 inches.

More specifically, the performance of the materials used in the UAV 100 allows a longer support boom span or length, which enables a more aerodynamically efficient configuration, which minimizes competition between the rotors 230 for their inflow of air. Without limitation, the materials used to form the components of the UAV 100 can include, for example and without limitation, carbon fiber, metal, or plastic.

The vehicle body 110 can be mounted at an angle when the UAV 100 is at rest on a landing surface so that in cruise pitch attitude the vehicle body 110 is horizontal and produces less drag. Third, the support booms 120, 130 can have the aerodynamic fairings 310, 330, 410, 420, 430 that are configured to prevent separation of the air around the support booms 120, 130, which leads to a more efficient hover and less drag in cruise. In addition, each of the fairings 310, 330, 410, 420, 430 can be shaped to provide desired lift greater than its own weight. Fourth, because gasoline has a much higher energy density than batteries, the use of a gasoline powered combustion engine significantly increases the energy that can be stored on the aircraft. By converting the energy produced by the combustion engine 210 into electrical power for use by electric motors, however, weight can be saved that might otherwise be added by a belt drive or other mechanical drive systems to supply mechanical power from the combustion engine 210 to the rotors 230. The combination of these unique features enables the superior performance of the UAV 100 disclosed herein.

In one aspect, it is contemplated that each of the fairings 310, 330, 410, 420, 430 will not have any active control surfaces. Instead, each of the fairings 310, 330, 410, 420, 430 is configured to be passively stable and able to trim or otherwise passively pivot or move to a desired angle of attack in flight by passively pivoting to the angle of attack 308 that achieves the best lift-to-drag ratio. This can be described as passive control of the fairings. In one aspect, each of the fairings 310, 330, 410, 420, 430 is free to pivot as much as 360 degrees about a one of the support booms 120, 130. In another aspect, each of the fairings 310, 330, 410, 420, 430 is free to pivot along a proscribed arcuate range to prevent creating interference with the rotors 230. In one aspect, the pivot location in each of the fairings 310, 330, 410, 420, 430 can enable a passively stable fairing. In a further aspect, careful design of the reflexed cambered airfoil can cause the fairing to pitch up or down to the desired angle of attack 308 to maximize the lift to drag ratio of each of the fairings 310, 330, 410, 420, 430. In one aspect, the weight of the counterweight 350 can be set so that the respective fairing balances at the pivot location. In another aspect, the mounting angle 355 of the counterweight 350 can be configured to maximize lift and minimize drag on each of the fairings 310, 330, 410, 420, 430 to which the counterweight 350 is attached. The mounting angle 355 of the counterweight can also increase the tendency of each of the fairings 310, 330, 410, 420, 430 to pitch forward when the trailing edge of such fairings are pointed towards the ground.

In the absence of aerodynamic control, movement and change in direction during flight of the UAV 100 can be achieved by differential throttle, i.e., by selectively increasing or decreasing the electrical power to individual electric motors 220 to produce roll, pitch, or yaw control of the UAV 100. In another aspect, movement and change in direction during flight of the UAV 100 can be achieved by selectively increasing or decreasing the electrical power to individual electric motors 220 to produce roll or pitch control of the UAV 100. In another aspect, yaw control can be achieved by gimballing or rotating one or more motors on each side—for example and without limitation, the outboard motors on the rear boom 130—to tip the thrust vector towards the front or towards the rear.

In one aspect, each of the rotors can be placed equidistant from a center of the vehicle body such as the center of gravity. This placement of the rotors leads to minimum structural weight of the UAV but results in rotors competing with each other for inflow air when the vehicle is at non-zero airspeed, which results in reduced propulsive efficiency. In one contemplated aspect, the rotors can be placed into a staggered rotor layout in which there is no more than one row of motors in front to compete for air with. In addition, the inflow of the rotors is not uniform, so placing the rear rotors 230 at different butt line (Y axis as referenced in FIGS. 1 and 13) locations than the forward rotors 230 can reduce the competition for air between the rotors.

In one aspect, the UAV 100 can be used for any number of purposes such as, for example and without limitation, monitoring food crops or inspecting infrastructure. In agriculture, the UAV 100 outfitted with various sensors can tell a farmer where to put more water, how much fertilizer to use, and can generally be used for mapping crops and other areas. In infrastructure inspection, the UAV 100 can be outfitted with various sensors can be used to identify natural gas leaks in a natural gas pipeline. Other uses can include, for example and without limitation, the following: other agricultural applications; pipe/power line surveillance; border surveillance; suspect tracking (i.e., criminal law enforcement); traffic monitoring; disaster response/relief; damage assessment; atmospheric/weather research; critical infrastructure monitoring; damage surveying; aerial photography; wildlife monitoring; communications/broadcast; movie production; aerial news coverage; mail/freight transport; flood mapping; real estate mapping; mining; and sporting event coverage.

Because of the extended flight duration possible with the UAV 100, the UAV 100 can potentially be used in not only line-of-sight (LOS) flights but also extended LOS and "beyond LOS" or "beyond visual line of site" (BVLOS) flights. In one further aspect, the UAV 100 can comprise Automatic Dependent Surveillance-Broadcast (ADS-B) surveillance technology when desired or other similar technologies to enable BVLOS operations. Devices enabling such technologies can weigh as much as one to two pounds or more but can be carried by the UAV 100.

In one exemplary aspect, an unmanned aerial vehicle can perform a vertical takeoff and landing. The vehicle can comprise: a vehicle body defining a longitudinal direction and a transverse direction, the vehicle body having opposing longitudinal sides; a first support boom coupled to the vehicle body at a first transverse axis and extending outwardly from the opposing longitudinal sides of the vehicle body; a second support boom coupled to the vehicle body at a second transverse axis positioned rearward from the first transverse axis and extending outwardly from the opposing longitudinal sides of the vehicle body; a plurality of electric motors, each of the plurality of electric motors coupled to a one of the first support boom and the second support boom, at least two electric motors of the plurality of electric motors positioned on each of the first support boom and the second support boom, a rotation axis of each of the at least two electric motors coupled to the second support boom offset in a transverse direction from a rotation axis of each of the at least two adjacent electric motors coupled to the first support boom; a plurality of rotors, each of the plurality of rotors coupled to a respective one of the plurality of electric motors; and a propulsion system coupled to the vehicle body.

In a further exemplary aspect, the propulsion system can comprise a hybrid propulsion system. In a further exemplary aspect, the hybrid propulsion system can comprise: a combustion engine positioned within the internal cavity of the body; an electric generator positioned within the internal cavity of the body; an electrical bus operatively coupled to the electric generator; a plurality of electric motors, each of the plurality of electric motors electrically coupled to the electrical bus; and a plurality of rotors, each of the plurality of rotors coupled to a respective one of the plurality of electric motors. In a further exemplary aspect, each of the plurality of rotors can comprise a propeller configured to rotate in flight about a rotation axis in a rotation plane angled with respect to a longitudinal axis of the vehicle body by a tilt angle. In a further exemplary aspect, the longitudinal axis of the vehicle body can be configured to remain substantially level during edge-wise flight. In a further exemplary aspect, a rotation axis of at least one of the plurality of electric motors can be selectively movable beyond the tilt angle in a forward or backward rotational direction.

In a further exemplary aspect, the vehicle can further comprise a drag-reducing fairing rotatably coupled to the support boom, the drag-reducing fairing being a passively controlled fairing configured to be rotatably biased in response to aerodynamic forces acting on the drag-reducing fairing. In a further exemplary aspect, the drag-reducing fairing defines an airfoil shape. In a further exemplary aspect, the drag-reducing fairing can define a reflexed cambered airfoil shape. In a further exemplary aspect, the drag-reducing fairing can be configured to trim to an angle of attack in a range of between about zero to about eight degrees during forward edgewise flight. In a further exemplary aspect, the drag-reducing fairing can comprise a counterweight extending from a leading edge of the fairing.

In a further exemplary aspect, the hybrid propulsion system can further comprise a vibration isolation system configured to reduce vibration transferred from the propulsion system to the vehicle body, the vibration isolation system comprising an engine mounting plate and a body mounting plate, the body mounting plate secured to the vehicle body and the engine secured to the engine mounting plate, the engine mounting plate secured to the body mounting plate by a plurality of vibration isolation spacers. In a further exemplary aspect, the vibration isolation system can be positioned inside the internal cavity of the vehicle body. In a further exemplary aspect, each of the plurality of vibration isolation spacers can comprise a first spacer secured to the engine mounting plate, a second spacer secured to the body mounting plate, and a connecting portion connecting the first spacer and the second spacer. In a further exemplary aspect, a one of the first spacer and the second spacer of each of the vibration isolation spacers can comprise a body formed from an elastomeric material.

In a further exemplary aspect, the first support boom can extend outwardly from the opposing longitudinal sides of the vehicle body at least partially in the transverse direction and the second support boom can extend outwardly from the opposing longitudinal sides of the vehicle body at least partially in the transverse direction. In a further exemplary aspect, a one of an axis of the first support boom and an axis of the second support boom can be angled rearward with respect to a one of the first transverse axis and the second transverse axis, respectively, of the vehicle body. In a further exemplary aspect, a one of the first support boom and the second support boom can be configured to be angled rearward by insertion of a spacer between the vehicle body and the one of a portion of the first support boom and a portion of the second support boom. In a further exemplary aspect, the spacer can be positioned between the vehicle body and the one of the first support boom and the second support boom without disassembly of the one of the first support boom and the second support boom.

In a further exemplary aspect, the first support boom can have a first portion extending outwardly from one longitudinal side of the vehicle body and a second portion extending outwardly from the opposing longitudinal side of the vehicle body, a first and second pairs of electric motors of the plurality of electric motors can be positioned adjacent each other on the respective first and second portions of the first support boom, and the rotation directions of the rotors coupled to the respective first and second pairs of electric motors can be in opposition for each pair of electric motors. In a further exemplary aspect, the second support boom can have a first portion extending outwardly from one longitudinal side of the vehicle body and a second portion extending outwardly from the opposing longitudinal side of the vehicle body, a first and second pairs of electric motors of the plurality of electric motors can be positioned adjacent each other on the respective first and second portions of the second support boom, and the rotation directions of the rotors coupled to the respective first and second pairs of electric motors can be in opposition for each pair of electric motors.

In another exemplary aspect, the unmanned aerial vehicle can comprise: a vehicle body defining a longitudinal direction and a transverse direction, the vehicle body having opposed longitudinal sides; a first support boom coupled to the vehicle body at a first transverse axis and extending outwardly from the opposing longitudinal sides of the vehicle body at least partially in the transverse direction; a second support boom coupled to the vehicle body at a second transverse axis positioned rearward from the first transverse axis and extending outwardly from the opposing longitudinal sides of the vehicle body at least partially in the transverse direction; a plurality of electric motors, each of the plurality of electric motors coupled to a one of the first support boom and the second support boom, at least two electric motors of the plurality of electric motors positioned on each of the first support boom and the second support boom, a rotation axis of each of the at least two electric motors coupled to the second support boom offset in a transverse direction from a rotation axis of each of the at least two electric motors coupled to the first support boom; a plurality of rotors, each of the plurality of rotors coupled to a respective one of the plurality of electric motors; and a hybrid propulsion system coupled to the vehicle body, the hybrid propulsion system comprising: a combustion engine positioned within the internal cavity of the body; an electric generator positioned within the internal cavity of the body; an electrical bus operatively coupled to the electric generator; a plurality of electric motors, each of the plurality of electric motors electrically coupled to the electrical bus.

In another exemplary aspect, an aerial vehicle can comprise: a vehicle body; at least one support boom coupled to the vehicle body; and a hybrid propulsion system coupled to the vehicle body.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. An unmanned aerial vehicle, the vehicle comprising:
   a vehicle body defining a longitudinal direction and a transverse direction, the vehicle body having opposing longitudinal sides and defining a first transverse axis and a second transverse axis positioned rearward from the first transverse axis;
   a pair of first support booms, each first support boom coupled to the vehicle body at a first end and extending outwardly from one of the opposing longitudinal sides of the vehicle body at a selected first sweep angle relative to the longitudinal axis, and wherein the respective first ends of the pair of first support booms are positioned along a common first boom axis;
   a pair of second support booms, each second support boom coupled to the vehicle body at a first end and extending outwardly from one of the opposing longitudinal sides of the vehicle body, and wherein the respective first ends of the pair of second support booms are positioned along a common second boom axis;
   a plurality of electric motors comprising at least two electric motors coupled to the first support boom and at least two electric motors coupled to the second support boom;
   a pair of first wedge-shaped spacers, each first wedge-shaped spacer configured to be positioned between the vehicle body and a respective first end of a respective first support boom to position the respective first support boom at the selected first sweep angle; and
   at least one drag-reducing fairing rotatably coupled to at least one of the first and second support booms, the at least one drag-reducing fairing being a passively controlled fairing configured to be rotatably biased in response to aerodynamic forces acting on the drag-reducing fairing,
   wherein the longitudinal axis of the vehicle body is configured to remain substantially level during horizontal flight parallel to the longitudinal direction of the vehicle body.

2. The unmanned aerial vehicle of claim 1, further comprising a propulsion system in electrical communication with the plurality of electric motors, wherein the propulsion system is a hybrid propulsion system comprising:
   a combustion engine positioned within an internal cavity of the body;
   an electric generator positioned within the internal cavity of the body; and
   an electrical bus operatively coupled to the electric generator;
   wherein each of the plurality of electric motors is electrically coupled to the electrical bus.

3. The unmanned aerial vehicle of claim 1, further comprising a plurality of rotors, each of the plurality of rotors coupled to a respective one of the plurality of electric motors, wherein each of the plurality of rotors comprises a propeller configured to rotate in flight about a rotation axis in a rotation plane angled with respect to a longitudinal axis of the vehicle body by a tilt angle.

4. The unmanned aerial vehicle of claim 3, wherein a rotation axis of each of the at least two electric motors coupled to the second support boom is offset in a transverse direction from a rotation axis of each of the at least two adjacent electric motors coupled to the first support boom.

5. The unmanned aerial vehicle of claim 1, wherein the drag-reducing fairing is configured to trim to an angle of attack in a range of between about zero to about eight degrees during forward flight parallel to the longitudinal direction of the vehicle body.

6. The unmanned aerial vehicle of claim 5, wherein the drag-reducing fairing defines an airfoil shape.

7. The unmanned aerial vehicle of claim 6, wherein the drag-reducing fairing comprises a counterweight extending from a leading edge of the fairing.

8. The unmanned aerial vehicle of claim 1, wherein each second support boom extends outwardly from one of the opposing longitudinal sides of the vehicle body at a selected second sweep angle relative to the longitudinal axis.

9. The unmanned aerial vehicle of claim 8, further comprising further comprising a pair of second wedge-shaped spacers, each second wedge-shaped spacer configured to be positioned between the vehicle body and a respective first end of a respective second support boom to position the respective second support boom at the selected second sweep angle.

10. The unmanned aerial vehicle of claim 3, wherein the rotation directions of the rotors coupled to the at least two electric motors coupled to the first support boom are in opposition to the rotation directions of the rotors coupled to the at least two electric motors coupled to the second support boom.

11. The unmanned aerial vehicle of claim 2, wherein the hybrid propulsion system further comprises a vibration isolation system configured to reduce vibration transferred from the propulsion system to the vehicle body.

12. The unmanned aerial vehicle of claim 11, wherein the vibration isolation system comprising an engine mounting plate and a body mounting plate, wherein the body mounting plate is secured to the vehicle body and the engine is secured to the engine mounting plate.

13. The unmanned aerial vehicle of claim 12, wherein the engine mounting plate is secured to the body mounting plate by a plurality of vibration isolation spacers, and wherein at least one of the vibration isolation spacers comprises a body formed from an elastomeric material.

14. The unmanned aerial vehicle of claim 1, wherein each first support boom has an elongate section that extends outwardly from the opposing longitudinal sides of the vehicle body at least partially in the transverse direction and terminates is the first end of the first support boom, and wherein each second support boom has an elongate section that extends outwardly from the opposing longitudinal sides of the vehicle body at least partially in the transverse direction and terminates is the first end of the first support boom.

15. An unmanned aerial vehicle, the vehicle comprising:
a vehicle body defining a longitudinal direction and a transverse direction, the vehicle body having opposing longitudinal sides and defining a longitudinal axis;
a pair of first support booms, each first support boom coupled to the vehicle body at a first end and extending outwardly from the opposing longitudinal sides of the vehicle body, wherein the respective first ends of the pair of first support booms are positioned along a common first boom axis;
a pair of second support booms, each second support boom coupled to the vehicle body at a first end and extending outwardly from one of the opposing longitudinal sides of the vehicle body, wherein the respective first ends of the pair of second support booms are positioned along a common second boom axis;
a means for positioning at least one of the first or second support booms at a selected sweep angle relative to the longitudinal axis, wherein the means for positioning comprises a pair of first wedge-shaped spacers, each first wedge-shaped spacer configured to be positioned between the vehicle body and a respective first end of a respective first support boom to position the respective first support boom at a selected first sweep angle;
a plurality of electric motors comprising at least two electric motors coupled to the first support boom and at least two electric motors coupled to the second support boom; and
at least one drag-reducing fairing rotatably coupled to at least one of the first and second support booms, the at least one drag-reducing fairing being a passively controlled fairing configured to be rotatably biased in response to aerodynamic forces acting on the drag-reducing fairing,
wherein the longitudinal axis of the vehicle body is configured to remain substantially level during horizontal flight parallel to the longitudinal direction of the vehicle body.

16. The unmanned aerial vehicle of claim 15, further comprising a propulsion system in electrical communication with the plurality of electric motors, wherein the propulsion system is a hybrid propulsion system comprising:
a combustion engine positioned within an internal cavity of the body;
an electric generator positioned within the internal cavity of the body; and
an electrical bus operatively coupled to the electric generator;
wherein each of the plurality of electric motors is electrically coupled to the electrical bus.

17. The unmanned aerial vehicle of claim 15, further comprising a plurality of rotors, each of the plurality of rotors coupled to a respective one of the plurality of electric motors, wherein each of the plurality of rotors comprises a propeller configured to rotate in flight about a rotation axis in a rotation plane angled with respect to a longitudinal axis of the vehicle body by a tilt angle, and wherein a rotation axis of each of the at least two electric motors coupled to the second support boom is offset in a transverse direction from a rotation axis of each of the at least two adjacent electric motors coupled to the first support boom.

18. The unmanned aerial vehicle of claim 15, wherein the drag-reducing fairing is configured to trim to an angle of attack in a range of between about zero to about eight degrees during forward flight parallel to the longitudinal direction of the vehicle body.

19. The unmanned aerial vehicle of claim 18, wherein the drag-reducing fairing defines an airfoil shape, and wherein the drag-reducing fairing comprises a counterweight extending from a leading edge of the fairing.

20. The unmanned aerial vehicle of claim 15, wherein the means for positioning further comprises a pair of second wedge-shaped spacers, each second wedge-shaped spacer configured to be positioned between the vehicle body and a respective first end of a respective second support boom to position the second support boom at a selected second sweep angle.

21. The unmanned aerial vehicle of claim 17, wherein the rotation directions of the rotors coupled to the at least two electric motors coupled to the first support boom are in opposition to the rotation directions of the rotors coupled to the at least two electric motors coupled to the second support boom.

22. The unmanned aerial vehicle of claim 16, wherein the hybrid propulsion system further comprises a vibration isolation system configured to reduce vibration transferred from the propulsion system to the vehicle body.

23. The unmanned aerial vehicle of claim 15, wherein each first support boom has an elongate section that extends outwardly from the opposing longitudinal sides of the vehicle body at least partially in the transverse direction and terminates is the first end of the first support boom, and wherein each second support boom has an elongate section that extends outwardly from the opposing longitudinal sides of the vehicle body at least partially in the transverse direction and terminates is the first end of the first support boom.

24. An unmanned aerial vehicle, the vehicle comprising:
a vehicle body defining a longitudinal direction and a transverse direction, the vehicle body having opposing longitudinal sides and defining a longitudinal axis;
a pair of first support booms, each first support boom coupled to the vehicle body at a first end and extending outwardly from the opposing longitudinal sides of the vehicle body, wherein the respective first ends of the pair of first support booms are positioned along a common first boom axis;
a pair of second support booms, each second support boom coupled to the vehicle body at a first end and extending outwardly from one of the opposing longitudinal sides of the vehicle body, wherein the respective first ends of the pair of second support booms are positioned along a common second boom axis;
a means for positioning at least one of the first or second support booms at a selected sweep angle relative to the longitudinal axis, wherein the means for positioning comprises a pair of wedge-shaped spacers, each wedge-shaped spacer configured to be positioned between the vehicle body and a respective first end of a respective first or second support boom to position the respective first or second support boom at a selected sweep angle;

a plurality of electric motors comprising at least two electric motors coupled to the first support boom and at least two electric motors coupled to the second support boom; and at least one drag-reducing fairing rotatably coupled to at least one of the first and second support booms, the at least one drag-reducing fairing being a passively controlled fairing configured to be rotatably biased in response to aerodynamic forces acting on the drag-reducing fairing, wherein the longitudinal axis of the vehicle body is configured to remain substantially level during horizontal flight parallel to the longitudinal direction of the vehicle body.

25. The unmanned aerial vehicle of claim 24, further comprising a propulsion system in electrical communication with the plurality of electric motors, wherein the propulsion system is a hybrid propulsion system comprising:

a combustion engine positioned within an internal cavity of the vehicle body;

an electric generator positioned within the internal cavity of the vehicle body; and an electrical bus operatively coupled to the electric generator;

wherein each of the plurality of electric motors is electrically coupled to the electrical bus.

26. The unmanned aerial vehicle of claim 25, wherein the hybrid propulsion system further comprises a vibration isolation system configured to reduce vibration transferred from the propulsion system to the vehicle body.

27. The unmanned aerial vehicle of claim 24, further comprising a plurality of rotors, each of the plurality of rotors coupled to a respective one of the plurality of electric motors, wherein each of the plurality of rotors comprises a propeller configured to rotate in flight about a rotation axis in a rotation plane angled with respect to a longitudinal axis of the vehicle body by a tilt angle; and wherein a rotation axis of each of the at least two electric motors coupled to the second support boom is offset in a transverse direction from a rotation axis of each of the at least two adjacent electric motors coupled to the first support boom.

* * * * *